(12) United States Patent
Panaitopol et al.

(10) Patent No.: US 9,980,180 B2
(45) Date of Patent: May 22, 2018

(54) CONTROLLING DATA RATE AT A RELAY UE (UE-R) FOR RELAYING TRAFFIC TO AND FROM A RELAYED UE

(71) Applicant: NEC Corporation, Tokyo (JP)

(72) Inventors: Dorin Panaitopol, Berkshire (GB); Christophe Le Thierry D'Ennequin, Berkshire (GB); Benoit Lecroart, Berkshire (GB)

(73) Assignee: NEC Corporation, Tokyo (JP)

( * ) Notice: Subject to any disclaimer, the term of this patent is extended or adjusted under 35 U.S.C. 154(b) by 0 days. days.

(21) Appl. No.: 14/774,075

(22) PCT Filed: Mar. 5, 2015

(86) PCT No.: PCT/JP2015/001187
§ 371 (c)(1),
(2) Date: Sep. 9, 2015

(87) PCT Pub. No.: WO2015/141165
PCT Pub. Date: Sep. 24, 2015

(65) Prior Publication Data
US 2017/0006503 A1  Jan. 5, 2017

(30) Foreign Application Priority Data
Mar. 19, 2014 (GB) .................. 1404962.1

(51) Int. Cl.
*H04W 28/22* (2009.01)
*H04W 88/04* (2009.01)
(Continued)

(52) U.S. Cl.
CPC .......... *H04W 28/22* (2013.01); *H04W 4/008* (2013.01); *H04W 88/04* (2013.01); *H04W 92/18* (2013.01)

(58) Field of Classification Search
CPC ..... H04W 28/22; H04W 4/008; H04W 88/04; H04W 92/18
See application file for complete search history.

(56) References Cited

U.S. PATENT DOCUMENTS 9,641,347 B2 * 5/2017 Kim .................... H04L 12/1407
9,723,591 B2 * 8/2017 Rohit .................... H04W 72/04
(Continued)

FOREIGN PATENT DOCUMENTS

CN 101998520 A * 3/2011
EP 2806670 A1 * 11/2014 .......... H04W 76/023
(Continued)

OTHER PUBLICATIONS

Halllahan et al., Policies for Public Safety Use of Commerical Wireless Networks, Oct. 2010.*
(Continued)

*Primary Examiner* — Tejis Daya
(74) *Attorney, Agent, or Firm* — Finnegan, Henderson, Farabow, Garrett & Dunner, L.L.P.

(57) ABSTRACT

A communication system (1) is disclosed in which a relaying user device (UE-R) (3-2) obtains bit rate information (e.g. aggregate maximum bit rate, AMBR) for relaying data for another (relayed) user device (UE) (3-1, 3-3). The obtention of said bit rate information may by receiving a message from the another (relayed) device, UE1, for registering the UE1 to an application server, AS (PSCC). The registration message may comprise UE1 identity, UE-R identity and information identifying a bit rate required by the UE1 while communicating via the UE-R (e.g. an AMBR parameter such as Relay-APN-AMBR). The UE-R sends the registration message received from the UE1 to a core network (7) node (e.g. a gateway device like a P-GW or S-GW, an MME, or a PCRF) comprising the information identifying a bit rate for relaying communication data for the UE (3-1, 3-3) to which (Continued)

the bit rate information relates. The UE-R (3-2) relays data received from the UE (3-1, 3-3) to a base station (5), and relays data for the UE (3-1, 3-3), received from the base station (5), to the UE (3-1, 3-3).

36 Claims, 10 Drawing Sheets

(51) Int. Cl.
*H04W 4/00* (2018.01)
*H04W 92/18* (2009.01)

(56) References Cited

U.S. PATENT DOCUMENTS

| | | | |
|---|---|---|---|
| 2005/0048914 A1* | 3/2005 | Sartori | H04B 7/2606 455/11.1 |
| 2005/0232183 A1 | 10/2005 | Sartori et al. | |
| 2007/0072604 A1* | 3/2007 | Wang | H04B 7/155 455/428 |
| 2007/0153698 A1* | 7/2007 | Lee | H04B 7/2606 370/235 |
| 2008/0285501 A1* | 11/2008 | Zhang | H04L 45/20 370/315 |
| 2009/0168763 A1* | 7/2009 | Choi | H04W 28/26 370/352 |
| 2011/0134887 A1* | 6/2011 | Jeon | H04W 36/0077 370/331 |
| 2011/0249609 A1* | 10/2011 | Brusilovsky | H04B 7/15521 370/315 |
| 2011/0275382 A1* | 11/2011 | Hakola | H04W 24/10 455/452.2 |
| 2012/0033606 A1* | 2/2012 | Chun | H04B 7/15528 370/315 |
| 2012/0093098 A1* | 4/2012 | Charbit | H04W 72/04 370/329 |
| 2012/0124229 A1* | 5/2012 | Sahu | H04W 76/02 709/228 |
| 2012/0250603 A1 | 10/2012 | Huang et al. | |
| 2012/0300712 A1* | 11/2012 | Hakola | H04W 74/008 370/329 |
| 2013/0016630 A1* | 1/2013 | Bhushan | H04W 48/12 370/255 |
| 2013/0159407 A1* | 6/2013 | Koskela | H04L 67/1063 709/204 |
| 2013/0160101 A1* | 6/2013 | Hakola | H04W 76/023 726/7 |
| 2013/0188552 A1* | 7/2013 | Kazmi | H04L 5/001 370/315 |
| 2014/0066119 A1* | 3/2014 | Tavildar | H04W 52/46 455/522 |
| 2014/0098777 A1* | 4/2014 | Lim | H04W 72/0413 370/329 |
| 2014/0133386 A1* | 5/2014 | Rohit | H04W 16/26 370/315 |
| 2014/0198637 A1* | 7/2014 | Shan | H04W 52/243 370/229 |
| 2015/0056987 A1* | 2/2015 | Li | H04W 76/023 455/434 |
| 2015/0305070 A1* | 10/2015 | Ahmad | H04W 48/20 370/338 |
| 2016/0080578 A1* | 3/2016 | Stenfelt | H04L 41/5025 455/406 |
| 2016/0119963 A1* | 4/2016 | Casati | H04W 76/023 455/434 |
| 2016/0309284 A1* | 10/2016 | Lee | H04W 4/08 |
| 2016/0381620 A1* | 12/2016 | Panaitopol | H04W 28/0257 370/315 |

FOREIGN PATENT DOCUMENTS

| | | | | |
|---|---|---|---|---|
| WO | WO 2006/134562 A2 | 12/2006 | | |
| WO | WO 2010/004295 A2 | 1/2010 | | |
| WO | WO 2010016676 A2 * | 2/2010 | | H04W 36/0077 |
| WO | WO 2012087109 A1 * | 6/2012 | | H04W 72/1221 |
| WO | WO 2013/114648 A1 | 8/2013 | | |

OTHER PUBLICATIONS

3GPP TS 36.413, V12.1.0, "S1 Application Protocol (S1AP)", 3$^{rd}$ Generation Partnership Project; Technical Specification Group Radio Access Network; Evolved Universal Terrestrial Radio Access Network (E-UTRAN), Release 12, pp. 1-285, Mar. 2014.
3GPP TS 23.401, V12.4.0, "General Packet Radio Service (GPRS) enhancements for Evolved Universal Terrestrial Radio Access Network (E-UTRAN) access", 3$^{rd}$ Generation Partnership Project; Technical Specification Group Services and System Aspects, Release 12, pp. 1-302, Mar. 2014.
3GPP TR 23.703, V12.0.0, "Study on architecture enhancements to support Proximity-based Services (ProSe)", 3$^{rd}$ Generation Partnership Project; Technical Specification Group Services and System Aspects, Release 12, pp. 1-324, Feb. 2014.
3GPP TS 36.300, V12.0.0, 3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, Release 12, pp. 1-208, Dec. 2013.
Search Report in corresponding British Application No. GB 1404962.1 dated Jul. 9, 2014.
International Search Report and Written Opinion dated Jun. 3, 2015.

* cited by examiner

CONTROLLING DATA RATE AT A RELAY UE (UE-R) FOR RELAYING TRAFFIC TO AND FROM A RELAYED UE

CROSS-REFERENCE TO RELATED PATENT APPLICATIONS

This application is a National Stage Entry of International Application No. PCT/JP2015/001187, filed Mar. 5, 2015, which claims priority from British Patent Application No. 1404962.1, filed Mar. 19, 2014. The entire contents of the above-referenced applications are expressly incorporated herein by reference.

TECHNICAL FIELD

The present invention relates to a communication system and to parts and methods thereof. The invention has particular but not exclusive relevance to wireless communication systems and devices thereof operating according to the 3GPP (3rd Generation Partnership Project) standards or equivalents or derivatives thereof.

BACKGROUND ART

Wireless communication systems enable users of User Equipment (UE) to communicate with other such users via one of a number of base stations and via one or a number of core networks. Typically, the UEs are mobile terminals, such as mobile (cellular) telephones and the like, although the term UE may also refer to generally stationary communication devices, such as laptop computers, web browsers, machine-type communication devices, and the like. In the following description the term user communication device is used, which is intended to cover any type of such user equipment (mobile and stationary).

In an active or connected state a user communication device is registered with the network and has a Radio Resource Control (RRC) connection with a base station so that the network knows to which base station (or cell thereof) the user communication device belongs and can transmit data to and receive data from the user communication device. Each user communication device also establishes a default Evolved Packet System (EPS) Bearer (i.e. an end-to-end dedicated communication path) from the user communication device to an endpoint beyond the base station, typically a gateway (such as a packet data network gateway—"PDN-GW" or "P-GW"—or the like), in the Enhanced Packet Core (EPC) network, or core network for short. An EPS Bearer, which is specific to the user communication device, defines a transmission path through the network and assigns an Internet Protocol (IP) address to the user communication device.

A Mobility Management Entity (MME) in the core network manages general mobility aspects of the user communication devices and ensures that connectivity is maintained with the user communication devices, for example as they are moving within the geographical area covered by the communication system (and/or as they are handed over between base stations of the communication system due to movement or changes in communication conditions). The MME also manages the various bearers associated with the user communication devices (such as an EPS bearer and/or the like) by controlling the other network nodes via which such bearers are provided. In order to do so, the MME exchanges Non-Access Stratum (NAS) signalling messages with the user communication devices (and/or the other network nodes) to manage the establishment of a communication session.

As part of the Long Term Evolution (LTE) of UTRAN (UMTS Terrestrial Radio Access Network) referred to as E-UTRAN, proximity-based services (ProSe) have been introduced, which make use of direct device-to-device (D2D) communication bearers directly between compatible user communication devices rather than indirect bearers provided from one user communication device, via a base station and the core network, to another user communication device (e.g. over a pair of EPS bearers). Thus, when a ProSe enabled user communication device is within the transmission range of (or served by the same base station as) another ProSe user communication device, they can communicate user data without the need to use core network resources. Such services can be achieved by establishing a special, "D2D", bearer between the user communication devices in direct communication (or communication routed via their base station only) instead of their default or other conventional EPS bearers (which might be still used for other types of communications). This direct or locally routed communication could result in better utilization of the available resources, especially on the radio interface, where these are limited. Details of the ProSe functionality have been specified in the 3GPP Technical Report TR 23.703 document, the contents of which are incorporated herein by reference.

More recently the provision of a relay functionality, in the user communication device, using the ProSe functionality has been proposed to allow one user communication device (referred to as a "UE-Relay" or "UE-R") to relay the signalling and the user data for another user communication device to and from the network, even if the other user communication device is not located within the networks coverage. In this case, the relayed user communication device can communicate with the network (both user plane and control plane data) via the UE-R thus accessing the same services as if the relayed user communication devices were served by a base station of the network.

In order to be able to benefit from ProSe services, a ProSe enabled user communication device performs a so-called discovery procedure (which can be done with or without network assistance/coverage). As part of this discovery procedure, each ProSe enabled user communication device transmits (e.g. periodically) a beacon for announcing itself to other such user communication devices in its proximity, and also listens for beacon transmissions by other devices. After two (or more) user communication devices have mutually discovered each other (e.g. they have received the other user communication device's beacon), they are able to start a ProSe communication session with each other.

The user communication device operating as a UE-R is able to relay traffic to one or more connected user communication devices via a (Relay) Packet Data Network (PDN) connection. In addition to this relay connection, the UE-R sends or receives (non-relayed) traffic for its own use (e.g. voice calls, Internet service, multimedia service, and/or the like).

In an exemplary scenario, a group of users (e.g. a team of Public Safety Officers at an emergency scene) may need to communicate with each other and/or with the network even when there is insufficient network coverage. In this case, one user can use his/her terminal as UE-Relay, while continuing to use it for his/her own needs as well. For example, the user of the UE-R may be using the following services: i) (group) voice services via an access point (gateway); and ii) video streaming from a remote server (e.g. an emergency scene monitoring server) via another (or the same) access point.

An access point typically comprises a gateway (e.g. a P-GW mentioned above) and can be identified by its associated Access Point Name (APN). In order to ensure that an appropriate level of service (e.g. a desired data rate) can be provided for each user in the communication network, the network operator assigns various parameters that determine an aggregate maximum bit rate (AMBR) that can be provided to the users (subscribers) in the network per subscriber and per access point. Specifically, for each subscriber, the Home Subscriber Server (HSS) holds an associated "HSS_APN-AMBR" parameter (per APN) and an "HSS_UE-AMBR" parameter, forming part of the user's subscription data.

The HSS_APN-AMBR (APN Aggregate Maximum Bit Rate) parameter for a particular (subscriber's) user communication device limits the non-guaranteed aggregate bit rate across all PDN connections by that user communication device via a particular APN. The actual "APN-AMBR" parameter to be used (enforced) by the given access point (e.g. P-GW) is provided by the MME based on subscription data obtained from the HSS.

The HSS_UE-AMBR (UE Aggregate Maximum Bit Rate) parameter for a particular (subscriber's) user communication device limits the total traffic of that user communication device on uplink and downlink (via the serving base station). The actual "UE-AMBR" parameter to be used (enforced) by the serving base station is provided by the MME based on subscription data obtained from the HSS. Specifically, the MME computes the UE-AMBR parameter such that it equals the smaller of the sum of all HSS_APN-AMBR parameters of active APNs and the HSS-UE-AMBR parameter. This is further illustrated in the 3GPP TS 23.401 standard, the contents of which are incorporated herein by reference. The MME transmits the calculated UE-AMBR parameter to the serving base station, which base station is thus able to allow/discard data traffic for the user communication device in accordance with the UE-AMBR parameter. This is further illustrated in the 3GPP TS 36.413 and TS 36.300 standards, the contents of which are incorporated herein by reference.

Thus traffic sent/received by a particular user communication device in excess of the bit rate indicated by the UE-AMBR parameter may get discarded by a rate shaping function of the base station serving that user communication device, and traffic exceeding the bit rate indicated by the applicable APN-AMBR parameter may get discarded by a rate shaping function of the corresponding APN. The UE-AMBR parameter and the APN-AMBR parameter are applicable across all non-Guaranteed Bit Rate (non-GBR) bearers of a particular subscriber (i.e. a user communication device associated with that subscriber).

SUMMARY OF INVENTION

Technical Problem

Since any user communication device behind the UE-R is not (necessarily) considered as being attached to the core network or as being in a connected state (although they are still able to communicate via the UE-R), any data communicated for such relayed user communication devices can only be sent/received whilst such data does not exceed the corresponding APN-AMBR and/or the UE-AMBR value for the UE-R. However, the values for the APN-AMBR and/or the UE-AMBR for the UE-R may be too small to support both relayed traffic and normal traffic destined to UE-R. This may be particularly problematic when the bandwidth needed for relaying purposes changes dynamically (e.g. in the case of public safety scenarios), such as when a relayed UE temporarily requires a large additional bandwidth (e.g. a fireman uploading/streaming a video file to other users from the scene of an emergency/accident).

Further, the UE-R may be configured to prioritise its own (non-relayed) traffic and de-prioritise any relayed traffic. Therefore, compared to regular (non-relayed) communication services, the user experience perceived by users of relayed user communication devices (and/or possibly by the user of the UE-R as well) may deteriorate whilst UE-R based relaying is used.

A possible solution would be for the network operator to increase the values of the APN-AMBR and the UE-AMBR parameters stored in the HSS for the UE-R to account for the additional data usage during relaying. However, such solution would have a significant drawback that, effectively, it would give additional privileges (e.g. higher effective data rates) to the user of the UE-R. Further, the increase of the values of the APN-AMBR and the UE-AMBR parameters for the UE-R would not guarantee fair (even) data usage between the UE-R and connected (relayed) user communication devices. In fact, any increase in the aggregate maximum bit rate values for the UE-R may still not result in any increase in bit rate for relayed user communication devices connected to that UE-R. In addition, such relayed user communication devices are not necessarily perceived by the core network as being attached, and hence their associated aggregate maximum bit rate values (stored in the HSS) cannot be used by the network for relayed traffic.

Accordingly, preferred embodiments of the present invention aim to provide methods and apparatus which overcome or at least partially alleviate one or more of the above issues.

Solution to Problem

In one aspect, the invention provides a relaying user communication device for relaying communication data for other user communication devices in a cellular communication network, the user communication device comprising: means for communicating with other communication devices in the cellular communication network, the communicating means being operable: to communicate via a first communication interface with at least one other user communication device; and to communicate via a second communication interface with a base station; means for controlling said communicating means to relay communication data received from each other user communication device via said first interface, to said base station via said second interface, and to relay communication data received from the base station via said second interface for each other user communication device, to that other user communication device, via said first interface; and means for obtaining information identifying a bit rate for relaying communication data for at least one other user communication device; wherein said controlling means is operable to control said communicating means to send, to at least one core network node via said base station, said information identifying a bit rate for relaying communication data for the at least one other user communication device to which the bit rate relates.

The obtaining means may be operable to obtain said information identifying a bit rate for relaying communication data for at least one other user communication device by receiving the information identifying a bit rate from the at least one other user communication device to which the bit rate relates.

The obtaining means may be operable to obtain said information identifying a bit rate for relaying communication data for at least one other user communication device during a process to register said at least one other user communication device with an application server (AS).

The obtaining means may be operable to obtain said information identifying a bit rate for relaying communication data for at least one other user communication device during a process to establish a relaying connection.

The obtaining means may be operable to obtain said information identifying a bit rate for relaying communication data for at least one other user communication device: by receiving an identifier associated with said bit rate from the at least one other user communication device to which the bit rate relates; and by obtaining said information identifying a bit rate for relaying communication data for the at least one other user communication device to which the bit rate relates based on said received identifier.

The obtaining means may be operable to obtain said information identifying a bit rate for relaying communication data for at least one other user communication device during a process to establish a relaying connection.

The controlling means may be operable to control said communicating means to send, to a core network device via said base station, said information identifying a bit rate in association with information identifying said relaying user communication device.

The controlling means may be operable to control said communicating means to send, to a core network device via said base station, said information identifying a bit rate in association with information identifying said at least one other user communication device to which the bit rate relates.

The information identifying said relaying user communication device and/or said information identifying at least one other user communication device to which the bit rate relates may comprise at least one of: an International mobile Subscriber Identity (IMSI) associated with that user device; an IP address associated with that user device; a public safety identifier associated with that user device; a Mobile Station International Subscriber Directory Number (MSISDN) associated with that user device; a proximity services identifier (ProSe ID) associated with that user device; a Temporary Mobile Subscriber Identifier (TMSI) associated with that user device; and a Globally Unique Temporary Identifier (GUTI) associated with that user device.

The information identifying a bit rate may comprise an aggregate maximum bit rate (AMBR). The information identifying a bit rate may comprise an aggregate maximum bit rate (AMBR) for a specific access point (APN_AMBR). The information identifying a bit rate may comprise an aggregate maximum bit rate (AMBR) associated with a particular service (e.g. a particular public service). The information identifying a bit rate may comprise an aggregate maximum bit rate (AMBR) associated with a particular public safety service (e.g. a particular public service). The information identifying a bit rate may comprise an aggregate maximum bit rate (AMBR) associated with a particular user or user communication device identifier (user ID or user communication device ID).

The at least one core network node may comprise at least one of: a gateway device (e.g. packet data network gateway "PDN-GW" or "P-GW", or serving gateway (S-GW)); a mobility management entity (MME); and a Policy and Charging Rules Function (PCRF).

The controlling means may be operable to control said communicating means to send, to at least one core network node via said base station, and said at least one core network node to an application server (for example, a Public Safety Control Center (PSCC) and/or a Group Communication System Enablers (GCSE) AS).

In one aspect, the invention provides user communication device for communicating data to a relaying user communication device for relaying by the relaying user communication device in a cellular communication network, the user communication device comprising: means for communicating with other communication devices in the cellular communication network, the communicating means being operable to communicate, via a communication interface with the relaying user communication device, information from which can be determined a bit rate can be determined for relaying communication data on behalf of said user communication device.

The communicating means may be operable to communicate information from which can be determined a bit rate for relaying communication data on behalf of said user communication device comprising information identifying the bit rate for relaying communication data on behalf of said user communication device.

The communicating means may be operable to communicate information from which can be determined a bit rate for relaying communication data on behalf of said user communication device comprising an identifier associated with said bit rate.

In one aspect, the invention provides a core network node comprising: means for receiving information, provided via a relaying user communication device, identifying a bit rate for relaying communication data for at least one other user communication device; means for generating, based on said information, provided via a relaying user communication device, identifying a bit rate: a parameter for controlling data throughput for communications with said relaying user communication device when said relaying user communication device has a relaying connection with said at least one other user communication device; and means for sending, to said relaying user communication device, said parameter for controlling data throughput; wherein said receiving means is operable to receive said information identifying a bit rate, from the relaying user communication device, via another core network node.

The receiving means may be operable to receive said information identifying a bit rate, from the relaying user communication device, via a base station without involving a core network gateway.

The receiving means may be operable to receive said information identifying a bit rate, from the relaying user communication device, via a core network gateway.

The receiving means may be operable to receive said information identifying a bit rate in association with information identifying said relaying user communication device via which the information identifying a bit rate was provided.

The core network node may be a mobility management entity (MME).

In one aspect, the invention provides a core network node comprising: means for receiving information, provided via a relaying user communication device, identifying a bit rate for relaying communication data for at least one other user communication device in association with information identifying the relaying user communication device via which the information identifying a bit rate was provided; and means for controlling data throughput for communications with said relaying user communication device, when said relaying user communication device has a relaying connection with said at least one other user communication device, based on said bit rate requested via said relaying user communication device.

The core network node may be a gateway device (e.g. packet data network gateway "PDN-GW" or "P-GW", or serving gateway (S-GW)).

In one aspect, the invention provides communication node comprising: means for receiving, via a relaying user communication device, information identifying a bit rate for relaying communication data for at least one other user communication device in association with information identifying the relaying user communication device via which the information identifying a bit rate was provided; and means for sending, to another core network node, said information identifying a bit rate for relaying communication data for at least one other user communication device in association with said information identifying the relaying user communication device via which the information identifying a bit rate was provided.

The communication node may be a gateway device (e.g. packet data network gateway "PDN-GW" or "P-GW", or serving gateway (S-GW)).

The communication node may comprise an application server (for example, a Public Safety Control Center (PSCC) and/or a Group Communication System Enablers (GCSE) AS).

The communication node may further comprise means for verifying whether a bit rate represented by said information identifying a bit rate is in conformity with at least one operator policy, wherein said sending means is operable to send, to said another core network node, said information identifying a bit rate when said information identifying a bit rate is in conformity with at least one operator policy, and said sending means may be operable not to send, to said another core network node, said information identifying a bit rate when said information identifying a bit rate is not in conformity with at least one operator policy.

The verifying means may be operable to adjust a value of said bit rate when said information identifying a bit rate is not in conformity with at least one operator policy, and said sending means may be operable to send, to said another core network node, information identifying said adjusted bit rate, when said information identifying a bit rate is not in conformity with at least one operator policy.

The core network node may comprise a Policy and Charging Rules Function (PCRF).

In one aspect, the invention provides a system comprising the above described relaying user communication device, the above described user communication device, the above described core network node, and the above described communication node.

Aspects of the invention extend to corresponding methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features.

In particular but without limitation the features of any of the claims dependent from a particular independent claim may be introduced into that independent claim in any combination or individually.

DESCRIPTION OF EMBODIMENTS

Embodiments of the invention will now be described, by way of example, with reference to the accompanying drawings.

<Overview>

Figure 1:
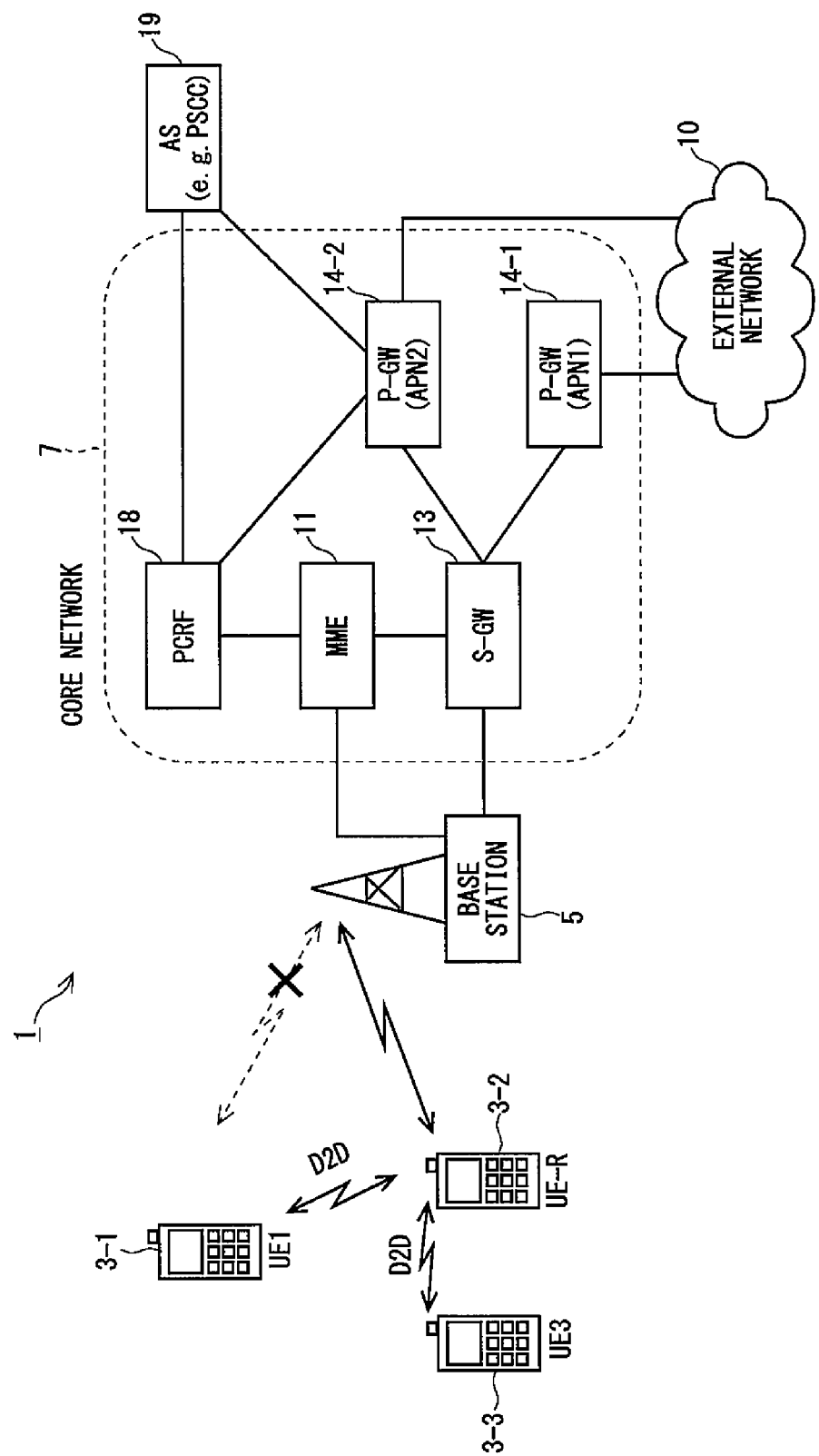
FIG. 1 illustrates schematically a cellular communication system to which embodiments of the invention may be applied.

FIG. 1 schematically illustrates a communication network (system) 1 in which users of user equipment (in this example user communication devices) 3-1 to 3-3 can communicate with each other and other users via an E-UTRAN base station 5 and a core network 7. As those skilled in the art will appreciate, three user communication devices 3 and one base station 5 are shown in FIG. 1 for illustration purposes, additional user equipment and/or base stations may be present in a deployed system.

The base station 5 is coupled to a core network 7 and the core network 7 is also coupled to other networks 10 (e.g. the Internet) via one or more gateways. The interface between the base station 5 and elements of the core network 7 might utilise, for example, a high speed, high bandwidth communication link, such as an optical fiber link and the like. The core network 7 includes, amongst other things, a mobility management entity (MME) 11, a serving gateway (S-GW) 13, Packet Data Network (PDN) Gateways (P-GWs) 14-1 and 14-2, a Policy and Charging Rules Function (PCRF) 18 and a Home Subscriber Server (HSS) (not shown in FIG. 1). An application server (AS) 19 is provided outside the core network for managing, in this embodiment, public safety control related communication (it will be appreciated, however, that the AS 19 may be in the core network 7 or external network 10). The application server 19 might comprise, for example, a Public Safety Control Center (PSCC) and/or a Group Communication System Enablers (GCSE) AS.

The MME 11 manages general mobility aspects of the user communication devices 3 and ensures that connectivity is maintained with the user communication devices 3 as they are moving within the geographical area covered by the communication system (and/or as they are handed over between base stations of the communication system). The MME 11 also manages the various bearers associated with the user communication devices 3 (e.g. such as an EPS bearer and/or a Multimedia Broadcast/Multicast Service (MBMS) bearer) by controlling the other network nodes via which such bearers are provided. The MME 11 is also responsible for ensuring that the users of each user communication device 3 receive an appropriate level of service (e.g. a desired bit rate) in accordance with their respective subscription. In particular, the MME 11 is responsible for calculating the associated AMBR values (based on information obtained from the HSS) for each user communication device 3 served by the MME 11.

The S-GW 13 connects the base station 5 (and hence the user communication devices 3) to the rest of the core network 7 for communicating user data using one or more associated bearer (such as an EPS bearer). The bearer carrying user data (for a corresponding user communication device 3) normally terminates at the P-GW 14 (i.e. the access point for that bearer), although it is often complemented by an external bearer as well between the P-GW 14 and a communication end-point outside the core network 7. It will be appreciated that, whilst shown as separate entities, the functionalities of the S-GW 13 and the P-GW 14 could be implemented in a single gateway element.

The user communication devices 3 shown in FIG. 1 are each equipped with ProSe functionality, thus they can establish direct communication (denoted "D2D" in FIG. 1) with each other (assuming they are within each other's vicinity and they have performed appropriate discovery and connection procedures).

In this example, the first user communication device 3-1 (denoted "UE1") and the third user communication device 3-3 (denoted "UE3") are outside the coverage of the base station 5 and the second user communication device 3-2 (denoted "UE-R") is within the coverage of the base station 5 (as indicated by the arrow between the user communication device 3-2 and the base station 5). The UE-R 3-2 is attached the core network 7 (via the base station 5), e.g. after having performed an appropriate network attachment procedure. Thus, the first and third user communication devices 3-1 and 3-3 can also access and be served by the core network 7 via the UE-R 3-2, using the UE-R's 3-2 connection (e.g. EPS bearer) with the core network 7.

Once the first and third user communication devices 3-1 and 3-3 are connected to (i.e. successfully established a relaying connection with) the UE-R 3-2, they can send and receive data to the core network 7 via the UE-R 3-2.

When a relaying capable user communication device (in this embodiment, UE-R 3-2), initially establishes a connection with the core network 7, the MME 11 obtains the subscription data associated with that user communication device 3-2 from the HSS. Using the subscription parameters (including the relay-specific AMBR parameters) for the UE-R 3-2, the MME 11 determines the applicable maximum authorized UE-AMBR parameter and any APN-AMBR parameters for the UE-R 3-2. When no other user communication device has a relaying connection with the UE-R 3-2, the UE-AMBR and APN-AMBR parameters are determined, by the MME 11 as normal. However, when one or more other user communication devices begins to establish a relaying connection via the UE-R 3-2 the MME 11 re-determines the UE-AMBR and APN-AMBR parameters, based on relay specific parameters provided by the relayed user communication devices themselves (via their associated application server, such as the PSCC when the relayed user communication device is operated by public safety personnel).

Specifically, in this embodiment, the AS 19 is configured to facilitate, by taking into account the bit rate requirements for the relayed user communication device 3-1, the configuration of:

i) a relay specific AMBR parameter ("Relay-APN-AMBR") to be enforced by the gateway 14 serving the UE-R 3-2 whilst communicating data packets for the relayed user communication devices via the UE-R 3-2; and ii) a relay specific AMBR parameter ("Relay-UE-AMBR") to be enforced by the base station 5 serving the UE-R 3-2 whilst communicating data packets for the relayed user communication devices via the UE-R 3-2.

In order to do so, the AS 19 obtains, from the relayed user communication device 3-1, information identifying the required data rate (bit rate) for that user communication device 3-1 whilst it is communicating via the UE-R 3-2. In this embodiment, the information identifying the required data rate for the user communication device 3-1 is provided during registration of the user communication device 3-1 with the AS 19 (following the successful establishment of a relaying connection between the user communication device 3-1 and the UE-R 3-2).

The registration of the user communication device 3-1 with the AS 19 serves to:
  inform the AS that the user communication device 3-1 is relayed;
  provide information identifying the UE-R 3-2 that the user communication device 3-1 is connected to and information identifying the user communication device 3-1 (e.g. at least one of: an International mobile Subscriber Identity (IMSI) associated with the UE-R 3-2; an IP address associated with the UE and/or UE-R 3-1, 3-2; a public safety identifier associated with the UE and/or UE-R 3-1, 3-2; a Mobile Station International Subscriber Directory Number (MSISDN) associated with the UE-R 3-2; a proximity services identifier (ProSe ID) associated with the UE and/or UE-R 3-1 or 3-2; a Temporary Mobile Subscriber Identifier (TMSI) associated with the UE-R 3-2; and a Globally Unique Temporary Identifier (GUTI) associated with the UE and/or UE-R 3-1, 3-2); and
  inform the AS about the data rate requirements (e.g. application-level bit rate information) of the user communication device 3-1.

Beneficially, the relayed user communication device 3-1 can provide, to its associated AS 19, information relating to its data rate requirements in the form of a so-called requested (or dynamic) "Relay-APN-AMBR" parameter (and/or the like) to be used by the APN (P-GW 14) serving the relayed user communication device 3-1.

In this embodiment, the AS 19 transmits, in an appropriately formatted signalling message, information identifying the UE-R 3-2 (and optionally information identifying the user communication device 3-1), and the Relay-APN-AMBR to the PCRF 18, which verifies the relayed user communication device's 3-1 request against the applicable network operator policies and, if necessary, adjusts the value of the Relay-APN-AMBR before instructing the MME 11 to re-compute the UE-AMBR value for the serving base station 5 and provide the Relay-APN-AMBR to the P-GW 14 serving the relayed user communication device 3-1.

It will be appreciated, however, that the verification by the PCRF 18 is optional, and that the AS 19 may transmit, in an appropriately formatted signalling message, the information identifying the UE-R 3-2 (and optionally information identifying the user communication device 3-1), and the Relay-APN-AMBR to the MME 11 without involving the PCRF 18.

In either case, the MME 11, upon receiving the Relay-APN-AMBR proceeds to re-calculate the bit rate parameter to be enforced by the base station 5. In this embodiment, the MME is configured to compute the UE-AMBR value based on the following equation.

$$\text{UE-AMBR} = \text{Min}(\text{Sum of HSS\_APN-AMBR of active APNs}, \text{HSS\_UE-AMBR}) + \text{Min}(\text{Sum of requested APN-AMBR of all relaying APNs}, \text{HSS\_UE-AMBR}) \quad <\text{Eq. 1}>$$

In other words, the UE-AMBR parameter is set to be the sum of: i) the smaller of the sum of all HSS_APN-AMBR parameters of active APNs and the HSS-UE-AMBR parameter; and ii) the smaller of the sum of all requested (or dynamic) Relay-APN-AMBR parameters of relaying APNs and the HSS-UE-AMBR parameter. In this context, the term "active APN" refers to an APN via which at least one PDN connection is established for communicating data packets for the UE-R 3-2, and the term "relaying APN" refers to an APN via which at least one PDN connection is established for communicating data packets for the relayed user communication device 3-1 (via the UE-R 3-2).

Thus, rather than simply accounting for the UE-R's 3-2 own (non-relayed) traffic, the MME 11 is able to anticipate the need for additional bit rate values at the authorised APNs to support relaying data via the UE-R 3-2.

The MME 11 provides the new value of the UE-AMBR parameter to the base station 5 serving the UE-R 3-2 and provides the value of the Relay-APN-AMBR parameter(s) to the P-GW(s) 14, as appropriate.

Thus, beneficially, the network entities in the communication system 1 are able to negotiate (dynamically) an appropriate bit rate parameter for the UE-R 3-2 in dependence on the actual bit rate requirements for the relayed user communication device 3-1 connected to the UE-R 3-2 rather than using static bit rate parameters for relaying, e.g. based on subscription data stored in the HSS.

Advantageously, therefore, during relaying the P-GW 14-1 and the P-GW 14-2 only discard traffic which is in excess of the bit rate indicated by their own applicable Relay-APN-AMBR parameter for the UE-R 3-2. Similarly, the base station 5 serving the UE-R 3-2 only discards traffic which is in excess of the bit rate indicated by the new relay specific value of UE-AMBR for that UE-R 3-2.

Thus, whenever there is data being communicated for the UE-R 3-2 and/or for any relayed user communication device 3-1 or 3-3, the communication network 1 is able to alleviate potential communication problems, for the users of each user communication device 3-1 to 3-3, arising from data packets being discarded due to inappropriate (e.g. too low) bit rate associated with the UE-R 3-2.

This approach also results in a better traffic distribution (fair use) between the UE-R 3-2 and any relayed user communication device 3-1, 3-3 connected to the UE-R 3-2 (but which are not themselves necessarily attached to the network). Further, it is also possible to prevent the user communication device 3-2 from overusing its bit rate allocations whilst operating as a UE-Relay.

Beneficially, there is no need to increase the value of the HSS_UE-AMBR and/or HSS_APN-AMBR parameters (in the HSS) associated with the subscriber operating the user communication device 3-2.

It is noted that, in the above embodiment, the UE-AMBR parameter is re-used with a new value (e.g. as opposed to using a dedicated UE-Relay-AMBR parameter). This can be beneficial as it allows the signalling between the MME 11 and base station 5 to remain essentially unchanged.

<User Communication Device>

Figure 2:
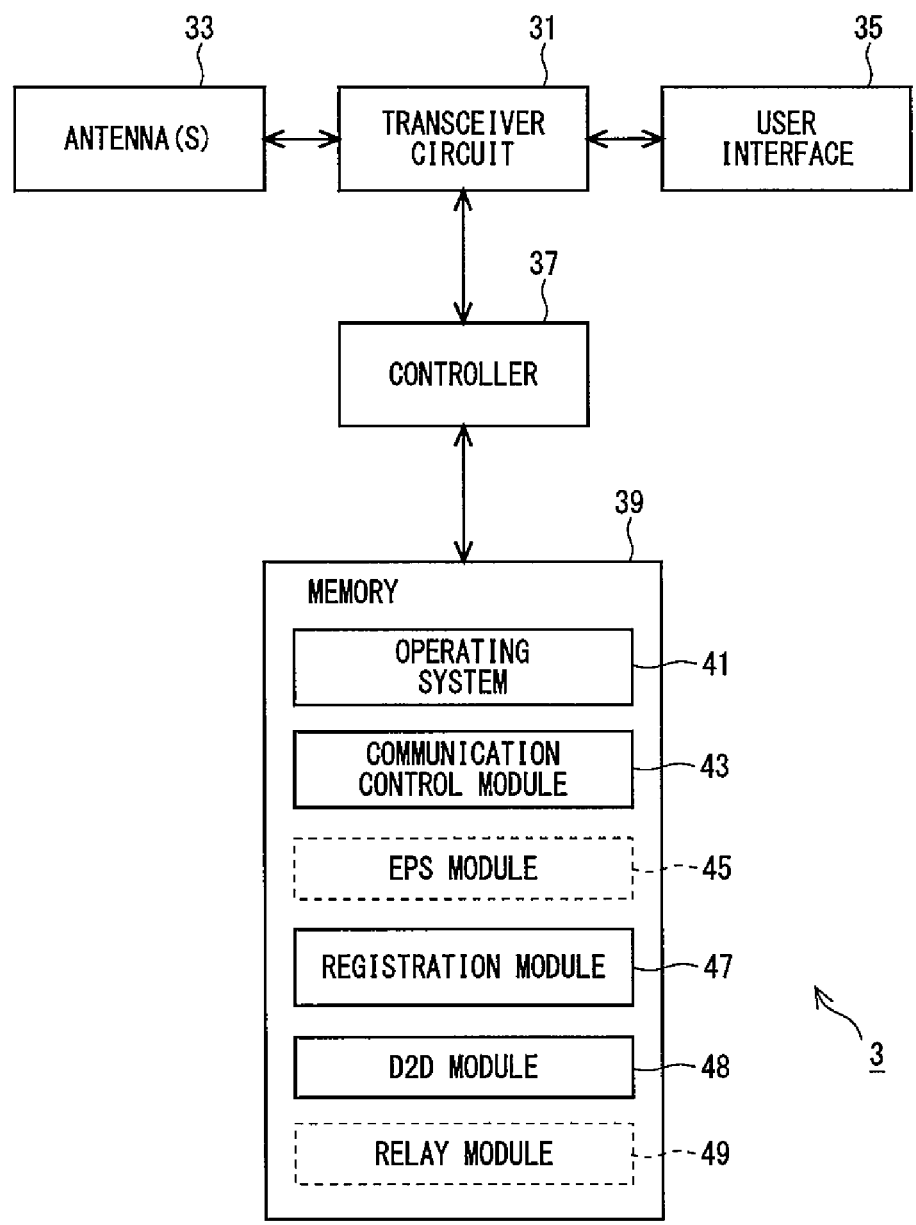
FIG. 2 is a functional block diagram illustrating some of the functionality of a user communication device forming part of the system shown in FIG. 1.

FIG. 2 is a functional block diagram illustrating some of the functionality of a user communication device 3 shown in FIG. 1. As shown in FIG. 2, the user communication device 3 has a transceiver circuit 31 that is operable to transmit signals to and to receive signals from a base station 5 and/or other user communication devices 3 via one or more antenna 33. The user communication device 3 has a controller 37 to control the operation of the user communication device 3. The controller 37 is associated with a memory 39 and is coupled to the transceiver circuit 31. Although not necessarily shown in FIG. 2, the user communication device 3 will of course have all the usual functionality of a conventional user communication device (such as a user interface 35) and this may be provided by any one or any combination of hardware, software and firmware, as appropriate. Software may be pre-installed in the memory 39 and/or may be downloaded via the communication network or from a removable data storage device (RMD), for example.

The controller 37 is configured to control overall operation of the user communication device 3 by, in this example, program instructions or software instructions stored within the memory 39. As shown in FIG. 2, these software instructions include, among other things, an operating system 41, a communication control module 43, an EPS module 45, a registration module 47, and a device-to-device (D2D) module 48. When the user communication device (e.g. the UE-R 3-2 shown in FIG. 1) is configured for relaying data for other communication devices 3, the UE-R 3-2 also includes a relay module 49.

The communication control module 43 handles (e.g. generates, sends and receives) control signals for controlling the connections between the user communication device 3 and other user communication devices, the base station 5, or the core network entities. The communication control module 43 also controls the separate flows of uplink/downlink data and signalling that are to be transmitted to/from the other user communication devices 3, to/from the base station 5, other user communication devices, and the core network entities using associated TFTs.

The EPS module 45 (which is optional when the user communication device 3 is being relayed via a UE-R) is operable to instruct the communication control module 43 to set up a communication path (EPS bearer) with the network. Each EPS bearer is associated with an EPS bearer ID, and at least one EPS TFT. When the user communication device 3 operates as a UE-R, the EPS module 45 maintains information on any EPS bearer for connected (relayed) user communication device(s), e.g. in addition to maintaining information on the UE-R's own EPS bearer(s).

The registration module 47 is responsible for registering the user communication device 3 with an associated application server 19 by generating and sending an appropriately formatted signalling message. The signalling message includes information identifying the user communication device 3. When the user communication device 3 is served by a UE-R, the signalling message also includes information identifying the UE-R and the bit rate requirement of the user communication device 3 whilst communicating via that UE-R.

The device-to-device module 48 is operable to instruct the communication control module 43 to set up a device-to-device communication path (e.g. a ProSe based relayed communication path) to other compatible user equipment in the vicinity of the user communication device 3. Each device-to-device communication path is associated with a D2D bearer ID, and at least one D2D TFT.

The relaying module 49 relays data for other user communication devices connected to the user communication device 3 whilst it is operating as a UE-R. The relaying module 49 may, for example, maintain a mapping between EPS bearer IDs (provided by the EPS module 45) and D2D bearer ID(s) (provided by the device-to-device module 48) for relaying data between such mapped bearers. The relaying module 49 receives data flows (e.g. IP packets associated with an appropriate EPS/D2D bearer ID) and forwards (relays) the received data based on the bearer mapping. The relaying module 49 may also receive data flows (e.g. IP packets associated with an appropriate EPS/D2D bearer ID) and forward (relay) the received data based on the associated TFT information to the appropriate D2D bearer (provided by the device-to-device module 48).

<Base Station>

Figure 3:
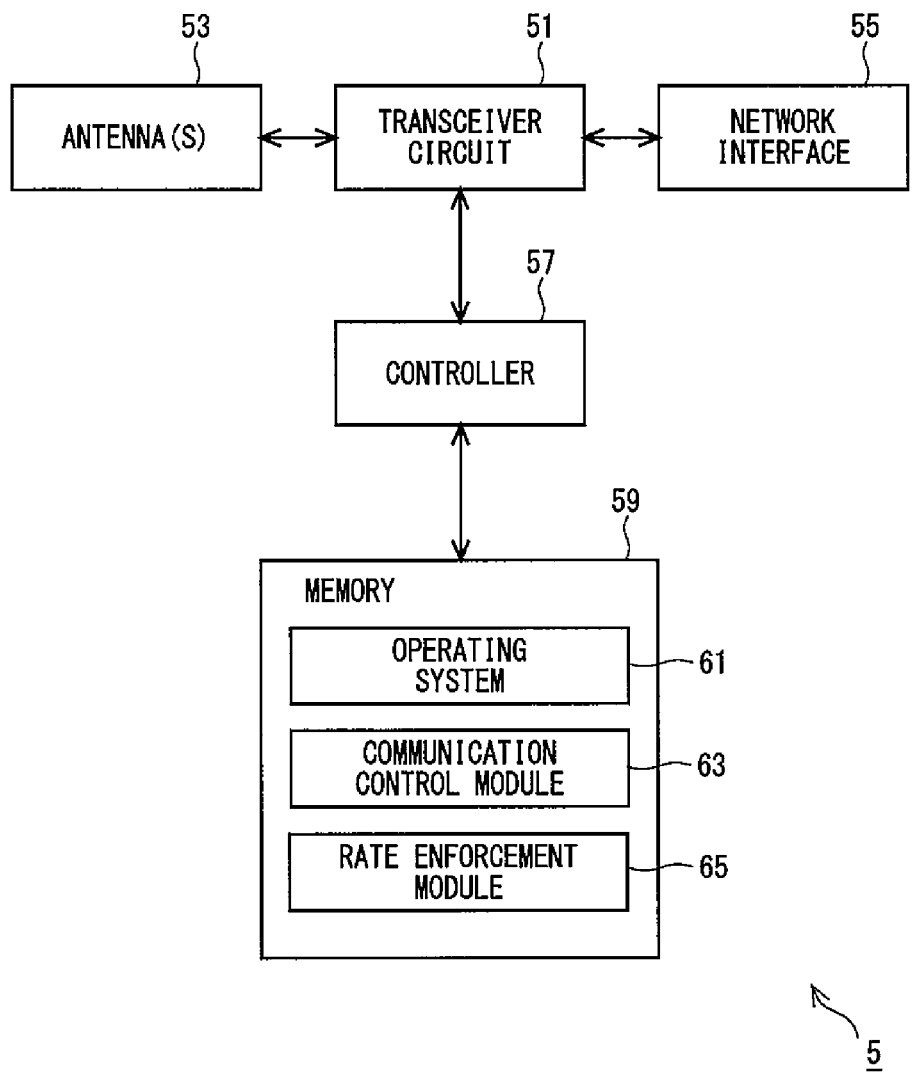
FIG. 3 is a functional block diagram illustrating some of the functionality of a base station forming part of the system shown in FIG. 1.

FIG. 3 is a functional block diagram illustrating some of the functionality of the base station 5 shown in FIG. 1. As shown in FIG. 3, the base station 5 has a transceiver circuit 51 that is operable to transmit signals to and to receive signals from user communication devices 3 via one or more antenna 53. The base station 5 has a controller 57 to control the operation of the base station 5. The controller 57 is associated with a memory 59 and is coupled to the transceiver circuit 51. Software may be pre-installed in the memory 59 and/or may be downloaded via the communication network or from a removable data storage device (RMD), for example.

The controller 57 is configured to control overall operation of the base station 5 by, in this example, program instructions or software instructions stored within the memory 59. As shown in FIG. 3, these software instructions include, among other things, an operating system 61, a communication control module 63, and a rate enforcement module 65.

The communication control module 63 handles (e.g. generates, sends and receives) control signals for controlling the connections between the base station 5 and user communication devices 3 or the core network entities. The communication control module 63 also controls the separate flows of uplink/downlink data and signalling that are to be transmitted from/to the user communication devices 3 and/or the core network entities.

The rate enforcement module 65 performs rate enforcement for user communication devices 3 served by the base station 5. Specifically, the rate enforcement module 65 is responsible for allowing traffic (e.g. data packets) to be transmitted to/from the UE-R 3-2 up to the bit rate indicated by the UE-AMBR for the UE-R 3-2. However, in the downlink, the rate enforcement module 65 discards any data packet which is sent/received in excess of the bit rate indicated by the UE-AMBR for the UE-R 3-2. In the uplink the rate enforcement module 65 prevents the allocation of resources if data traffic is in excess of the of the bit rate indicated by the UE-AMBR for the UE-R 3-2.

<Mobility Management Entity>

Figure 4:
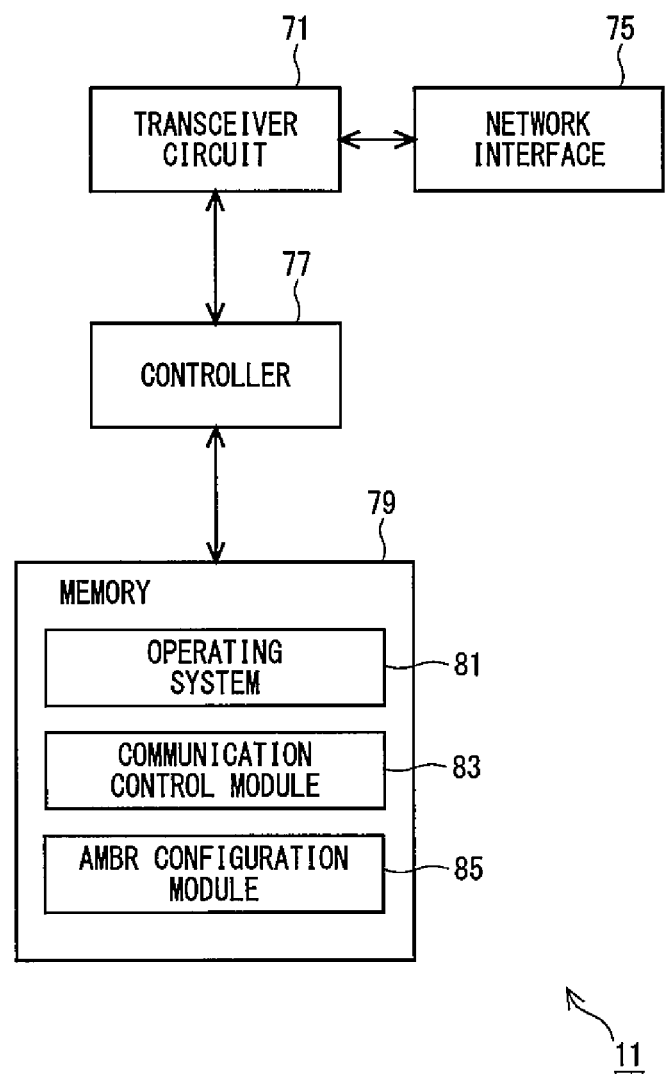
FIG. 4 is a functional block diagram illustrating some of the functionality of a Mobility Management Entity (MME) forming part of the system shown in FIG. 1.

FIG. 4 is a functional block diagram illustrating some of the functionality of a Mobility Management Entity 11 forming part of the system 1 shown in FIG. 1. As shown in FIG. 4, the MME 11 has a transceiver circuit 71 that is operable to transmit signals to and to receive signals from other communication nodes (such as the base station 5, the gateways 13/14, the PCRF 18, the AS 19, the HSS, and/or the user communication devices 3) via a network interface 75. The MME 11 has a controller 77 to control the operation of the MME 11. The controller 77 is associated with a memory 79 and is coupled to the transceiver circuit 71. Software may be pre-installed in the memory 79 and/or may be downloaded via the communication network or from a removable data storage device (RMD), for example.

The controller 77 is configured to control overall operation of the MME 11 by, in this example, program instructions or software instructions stored within the memory 79. As shown in FIG. 4, these software instructions include, among other things, an operating system 81, a communication control module 83, and an AMBR configuration module 85.

The communication control module 83 handles (e.g. generates, sends and receives) control signals for controlling the connections between the MME 11 and other communication nodes (e.g. the user communication devices 3, the base station 5, the gateways 13/14, the PCRF 18, the AS 19, and the HSS).

The AMBR configuration module 85 assists the configuration of the base station 5 and the PDN gateways 14-1 and/or 14-2, serving the user communication device 3-2 acting as a UE-R, for forwarding data between the network and the UE-R 3-2 (and/or any user communication device connected to it) in accordance with a data bit rate allowed by the subscription of the user of the UE-R 3-2. In order to do so, the AMBR configuration module 85 obtains subscription data (from the HSS) and data identifying a requested bit rate for relaying purposes (from the AS 19), and calculates (based on the obtained data) one or more appropriate AMBR value(s) for the UE-R 3-2, e.g. values associated with each access point (such as gateways 14-1 and 14-2) that the UE-R 3-2 is authorised to use. The AMBR configuration module 85 provides the appropriate calculated bit rate value(s) to the base station 5 and P-GW 14 serving the UE-R 3-2, for performing rate enforcement on the data packets communicated for the UE-R 3-2 (and/or any user communication device connected to it).

<Gateway Entity>

Figure 5:
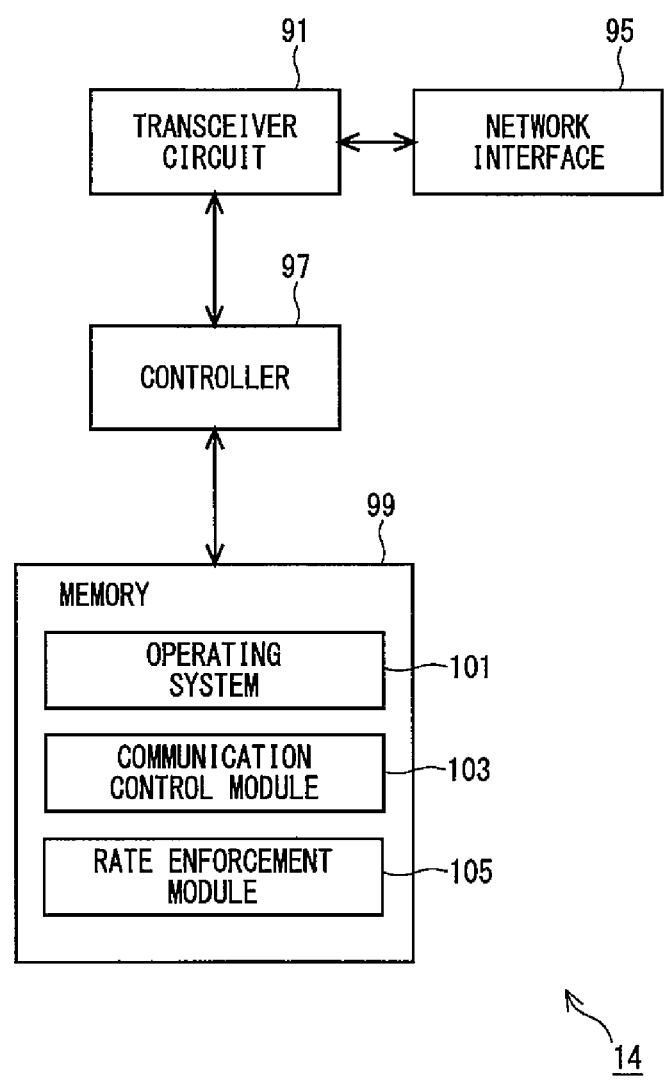
FIG. 5 is a functional block diagram illustrating some of the functionality of a PDN gateway (P-GW) forming part of the system shown in FIG. 1.

FIG. 5 is a functional block diagram illustrating some of the functionality of a PDN gateway 14 (such as the P-GW 14-1 and 14-2) forming part of the system 1 shown in FIG. 1. As shown in FIG. 5, the P-GW 14 has a transceiver circuit 91 that is operable to transmit signals to and to receive signals from a base station 5 and/or the user communication devices 3 via a network interface 95. The P-GW 14 has a controller 97 to control the operation of the P-GW 14. The controller 97 is associated with a memory 99 and is coupled to the transceiver circuit 91. Software may be pre-installed in the memory 99 and/or may be downloaded via the communication network or from a removable data storage device (RMD), for example.

The controller 97 is configured to control overall operation of the P-GW 14 by, in this example, program instructions or software instructions stored within the memory 99. As shown in FIG. 5, these software instructions include, among other things, an operating system 101, a communication control module 103, and a rate enforcement module 105.

The communication control module 103 handles (e.g. generates, sends and receives) control signals for controlling the connections between the P-GW 14 and other communication nodes (e.g. the user communication devices 3, the base station 5, and the MME 11).

The rate enforcement module 105 performs rate enforcement for user communication devices 3 served by the P-GW 14. Specifically, the rate enforcement module 105 is responsible for allowing traffic (e.g. data packets) to be transmitted to/from the UE-R 3-2 up to the bit rate indicated by the APN-AMBR (or Relay-APN-AMBR, if appropriate) for the UE-R 3-2. However, the rate enforcement module 105 discards any data packet which is sent/received in excess of the bit rate indicated by the APN-AMBR (or Relay-APN-AMBR) for the UE-R 3-2. It will be appreciated that the data packets may not be discarded but may, instead, be buffered for later communication (e.g. in the case of relaying).

<Policy and Charging Rules Function>

Figure 6:
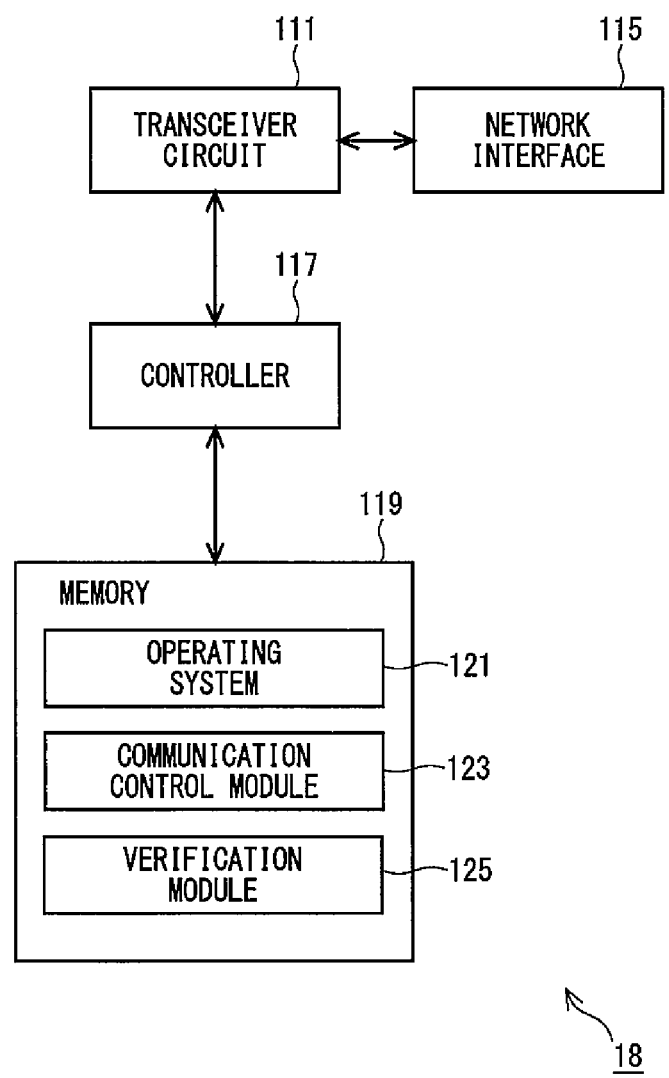
FIG. 6 is functional block diagram illustrating some of the functionality of a Policy and Charging Rules Function (PCRF) forming part of the system shown in FIG. 1.

FIG. 6 is a functional block diagram illustrating some of the functionality of a PCRF 18 forming part of the system 1 shown in FIG. 1. As shown in FIG. 6, the PCRF 18 has a transceiver circuit 111 that is operable to transmit signals to and to receive signals from other communication nodes (such as the AS 19 and/or the P-GW 14) via a network interface 115. The PCRF 18 has a controller 117 to control the operation of the PCRF 18. The controller 117 is associated with a memory 119 and is coupled to the transceiver circuit 111. Software may be pre-installed in the memory 119 and/or may be downloaded via the communication network or from a removable data storage device (RMD), for example.

The controller 117 is configured to control overall operation of the PCRF 18 by, in this example, program instructions or software instructions stored within the memory 119. As shown in FIG. 6, these software instructions include, among other things, an operating system 121, a communication control module 123, and a (bit rate) verification module 125.

The communication control module 123 handles (e.g. generates, sends and receives) control signals for controlling the connections between the PCRF 18 and other communication nodes (e.g. the AS 19 and/or the P-GW 14).

The verification module 125 is responsible to obtain, via the AS 19, information identifying a requested bit rate for a relayed user communication device 3, and to verify whether or not the requested bit rate complies with the applicable policies by the network operator. If required, e.g. when the requested bit rate does not comply with the applicable policies, the verification module 125 updates the bit rate value. After verification, the verification module 125 provides the value of the requested bit rate value (or the modified bit rate value, if appropriate) to the MME 11 via the P-GW 14.

In the above description, the user communication device 3, the base station 5, the mobility management entity 11, the P-GW 14, and the PCRF 18 are described for ease of understanding as having a number of discrete modules (such as the communications control modules, the relay module, the AMBR configuration module, and the rate enforcement modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

<Operation>

Figure 7:
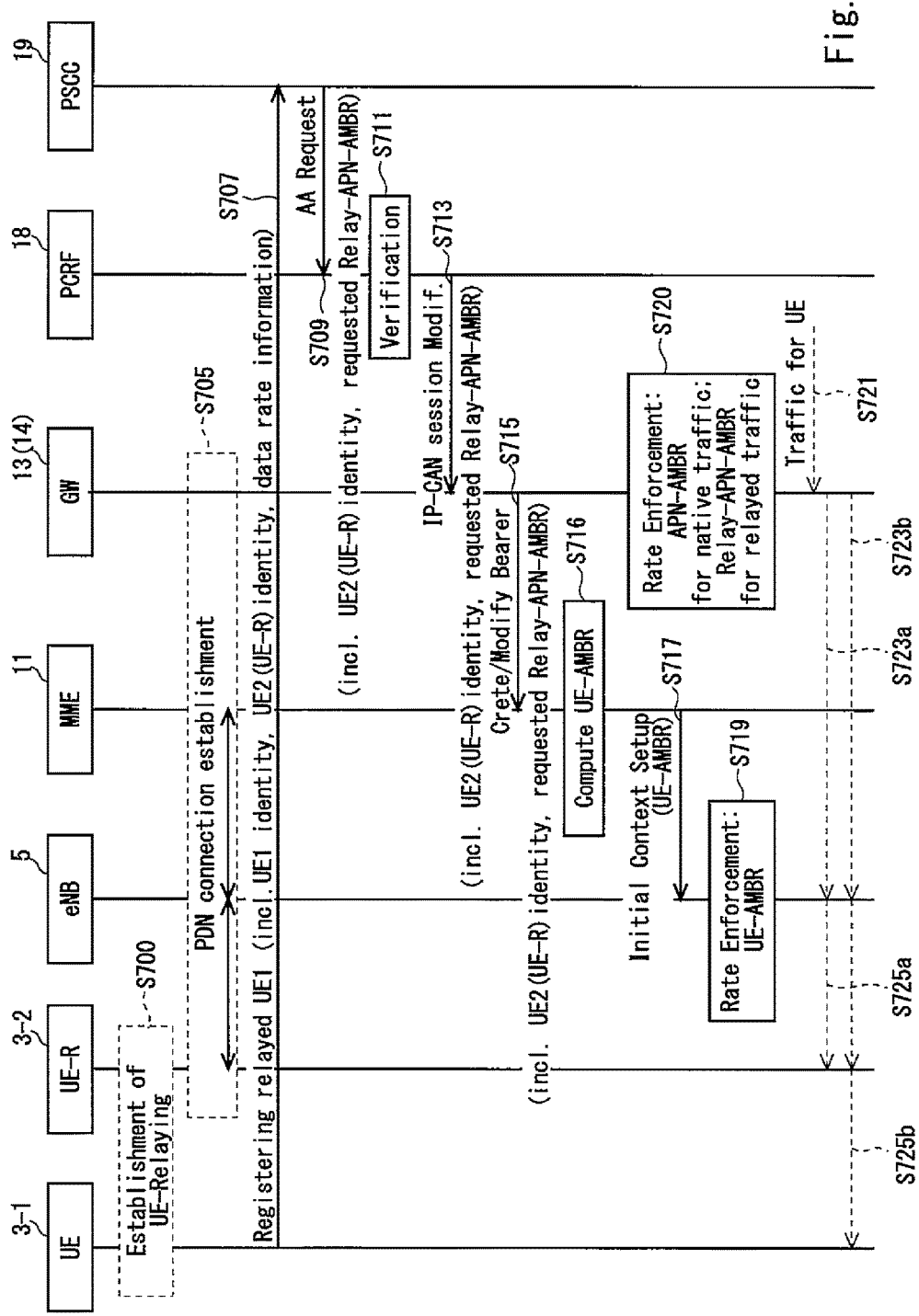
FIG. 7 is a timing diagram illustrating an exemplary way in which rate enforcement may be realised in the system shown in FIG. 1.

FIG. 7 is a timing diagram illustrating an exemplary way in which rate enforcement may be realised in the system 1 shown in FIG. 1.

Initially, the second user communication device 3-2 is set up as a UE-R (although there may not be any user equipment connected to it yet) and the user communication device 3-2 is within the coverage of the network (base station 5). As shown in step S700, the first user communication device 3-1 and the second user communication device 3-2 establish a relaying connection, which allows the first user communication device 3-1 to communicate with other nodes via the second user communication device 3-2 (operating as a UE-R).

When the UE-R 3-2 performs (not shown in FIG. 7) a network attachment procedure (e.g. by registering with the MME 11 serving the UE-R 3-2), as part of this procedure, the MME 11 obtains, from the HSS, subscription parameters associated with the user communication device 3-2, such as:

- an "HSS_APN-AMBR" parameter determining a gateway specific aggregate maximum bit rate allowed for the UE-R's 3-2 own (non-relayed) communications via the particular P-GW 14 (access point) serving the UE-R 3-2; and
- an "HSS_UE-AMBR" parameter determining an aggregate maximum bit rate allowed for all (non-relayed) communications for the UE-R 3-2 (regardless of which access point is used).

Following the receipt of the UE-R's 3-2 subscription parameters, the MME 11 calculates (using its AMBR configuration module 85) and provides the UE-AMBR parameter to the base station 5 and the respective APN-AMBR parameters to each P-GW(s) 14-1, 14-2 that the UE-R 3-2 is authorised to use. For example, the MME 11 may calculate these parameters as specified in the 3GPP TS 23.401 standard (e.g. for the UE-R's 3-2 native traffic).

Next, as generally shown in step S705, the UE-R 3-2 performs (using its EPS module 45) a PDN connection establishment procedure with the network (e.g. with the base station 5, the MME 11, and the P-GW 14 serving the UE-R 3-2).

Following the PDN connection establishment, the relayed user communication device 3-1 (using its registration module 47) generates and sends, in step S707, an appropriately formatted signalling message to the AS 19 (which is an application server associated with the user communication device 3-1) for registering the user communication device 3-1 for communicating via the UE-R 3-2. The registration message by the user communication device 3-1 includes information identifying the user communication device 3-1 (e.g. an MSISDN associated with the user communication device 3-1), information identifying the UE-R 3-2 (e.g. an MSISDN associated with the UE-R 3-2), and information identifying a bit rate required by the user communication device 3-1 whilst communicating via the UE-R 3-2 (e.g. an AMBR parameter, such as a Relay-APN-AMBR).

In response to the registration message from the relayed user communication device 3-1, the AS 19 generates and sends, in step S709, an appropriately formatted signalling message to the PCRF 18 (e.g. an "AA Request" message and/or the like) and includes in this message information included in the relayed user communication device's 3-1 registration message (the identity associated with the UE-R 3-2, and the requested Relay-APN-AMBR parameter).

In step S711, the PCRF 18 (using its verification module 125) checks whether or not the requested bit rate for the relayed user communication device 3-1 complies with the applicable policies (if any) set by the network operator. For example, the verification module 125 may be configured to compare the received Relay-APN-AMBR parameter to an operator (or user) specific threshold and determine that the requested bit rate complies with the applicable policies if the Relay-APN-AMBR value does not exceed (i.e. it is below or it equals to) the applicable threshold. If required, e.g. when the Relay-APN-AMBR value does exceed the applicable threshold, the verification module 125 determines that the requested bit rate does not comply with the applicable policies. In this case, the verification module 125 either updates the bit rate value and/or returns an appropriate error indication to the AS 19.

After the verification at S711, the PCRF 18 (using its verification module 125) generates and sends, in step S713, an appropriately formatted signalling message (e.g. an "IP-CAN Session Modification" message and/or the like) to the P-GW 14 (allocated for) serving the relayed user communication device 3-1. The message from the PCRF 18 includes the information identifying the UE-R 3-2 and the requested bit rate value (or the modified bit rate value, if appropriate) to be enforced by the P-GW 14 for the UE-R's 3-2 relayed communications for the first user communication device 3-1.

Effectively, the message at S713 (or a subsequent message) configures the rate enforcement module 105 of the P-GW 14 with the Relay-APN-AMBR parameter corresponding to the data rate required by the relayed user communication device 3-1 (requested at S707) whilst also taking into account the applicable network policies (verification/update performed at S711).

In step S715, the P-GW 14 (e.g. using its communication control module 103) generates and sends an appropriately formatted signalling message (e.g. a "Create/Modify Bearer Request" message and/or the like) to the MME 11. The P-GW 14 includes in this message the information identifying the UE-R 3-2 (e.g. the MSISDN thereof or other identification information) and the requested bit rate value (or the modified bit rate value, if appropriate) to be enforced by the P-GW 14 for the first user communication device 3-1.

Upon receipt of the signalling message from the P-GW 14, the MME 11 proceeds to calculating the value for the UE-AMBR for the UE-R 3-2 so that the value takes into account the bit rate required by (and/or authorised by the PCRF 18 for) the user communication device 3-1.

Thus, as generally shown in step S716, the MME 11 calculates (using its AMBR configuration module 85) a new value for the UE-AMBR parameter for the UE-R 3-2 whilst the UE-R 3-2 is relaying traffic for user communication device 3-1. Specifically, the MME 11 calculates the UE-AMBR parameter to be enforced by the base station 5 based on the following equation.

$$\text{UE-AMBR} = \text{Min}(\text{Sum of HSS\_APN-AMBR of active APNs}, \text{HSS\_UE AMBR}) + \text{Min}(\text{Sum of requested APN-AMBR of all relaying APNs}, \text{HSS\_UE-AMBR}) \qquad <\text{Eq. 2}>$$

In other words, the UE-AMBR parameter is set to be the sum of: i) the smaller of the sum of all HSS_APN-AMBR parameters of active APNs and the HSS-UE-AMBR parameter; and ii) the smaller of the sum of all requested (or dynamic) Relay-APN-AMBR parameters of relaying APNs and the HSS-UE-AMBR parameter.

Next, the MME 11 generates (using its communication control module 83) and sends, at step S717, an appropriately formatted signalling message (e.g. an "Initial Context Setup" message) to the base station 5 for configuring the rate enforcement module 65 with the UE-AMBR parameter to be applied for the UE-R's 3-2 communications, the UE-AMBR parameter taking into account the data rate requested by the user communication device 3-1 as well.

Upon receipt of the MME's 11 message, as shown in step S719, the base station 5 (e.g. using its rate enforcement module 65) is ready to apply the received UE-AMBR parameter for the UE-R's 3-2 subsequent communications with the network (both uplink and downlink).

As generally shown in step S720, the P-GW 14 is also ready to apply (using its rate enforcement module 105) the appropriate (requested) Relay-APN-AMBR parameter for the relayed user communication device's 3-1 subsequent communications with the network (via the UE-R's 3-2) via that P-GW 14. Specifically, the P-GW 14 may be configured to obtain the applicable Relay-APN-AMBR parameter included in the message from the PCRF 18, either directly from the PCRF's 18 message (sent at S713), or from a different message, e.g. a message from the MME 11 (not shown in FIG. 7) following step S715. It is noted that if the UE-R 3-2 is authorised to use that P-GW 14 for its native (i.e. non-relayed) communications with the network, the P-GW 14 also applies the corresponding "normal" APN-AMBR parameter (e.g. using its rate enforcement module 105) for the UE-R's 3-2 native communications via that P-GW 14.

As generally shown at step S721, the P-GW 14 receives data packets for the relayed user communication device 3-1 and/or the UE-R 3-2. Based on the obtained APN-AMBR parameter for the UE-R's 3-2 native traffic and the Relay-APN-AMBR parameter the UE-R's 3-2 traffic relayed for the user communication device 3-1, the P-GW 14 (using its rate enforcement module 105) determines whether or not a particular data packet can be forwarded towards the UE-R 3-2, in dependence on whether that data packet relates to native traffic or relayed traffic. Further details of the packet handling by the P-GW 14 are illustrated with reference to FIG. 9 below.

When the rate enforcement module 105 determines that a particular data packet can be forwarded towards the UE-R 3-2, the P-GW 14 forwards (via the base station 5), as generally shown at steps S723a and S723b, the data packets on the EPS bearer associated with the UE-R 3-2, in dependence on the applicable APN-AMBR and/or Relay-APN-AMBR.

From the base station 5, (native) user data for the UE-R 3-2 is transmitted to the UE-R 3-2 (at step S725a, and after performing rate enforcement based on the UE-AMBR parameter at step S719), and (relayed) user data for the user communication device 3-1 is transparently relayed by the UE-R 3-2 towards the user communication device 3-1 (at step S725b, and after performing rate enforcement based on the UE-AMBR parameter at step S719).

Beneficially, in this embodiment, there is no need for the base station 5 to distinguish between data packets for the UE-R 3-2 and data packets for the relayed user communication device 3-1, since the MME 11 provided, at step S717, an appropriate UE-AMBR parameter for the UE-R 3-2 taking into account the data rate requested by the user communication device 3-1 connected to the UE-R 3-2.

It will be appreciated that the data rate required by the relayed user communication device 3-1 may change. In this case, the relayed user communication device 3-1 may be configured re-register with the AS 19, e.g. by repeating step S707 (or by sending any suitable signalling message informing the AS 19 about the new data rate required), in which case steps S709 to S720 will also be repeated.

Figure 8:
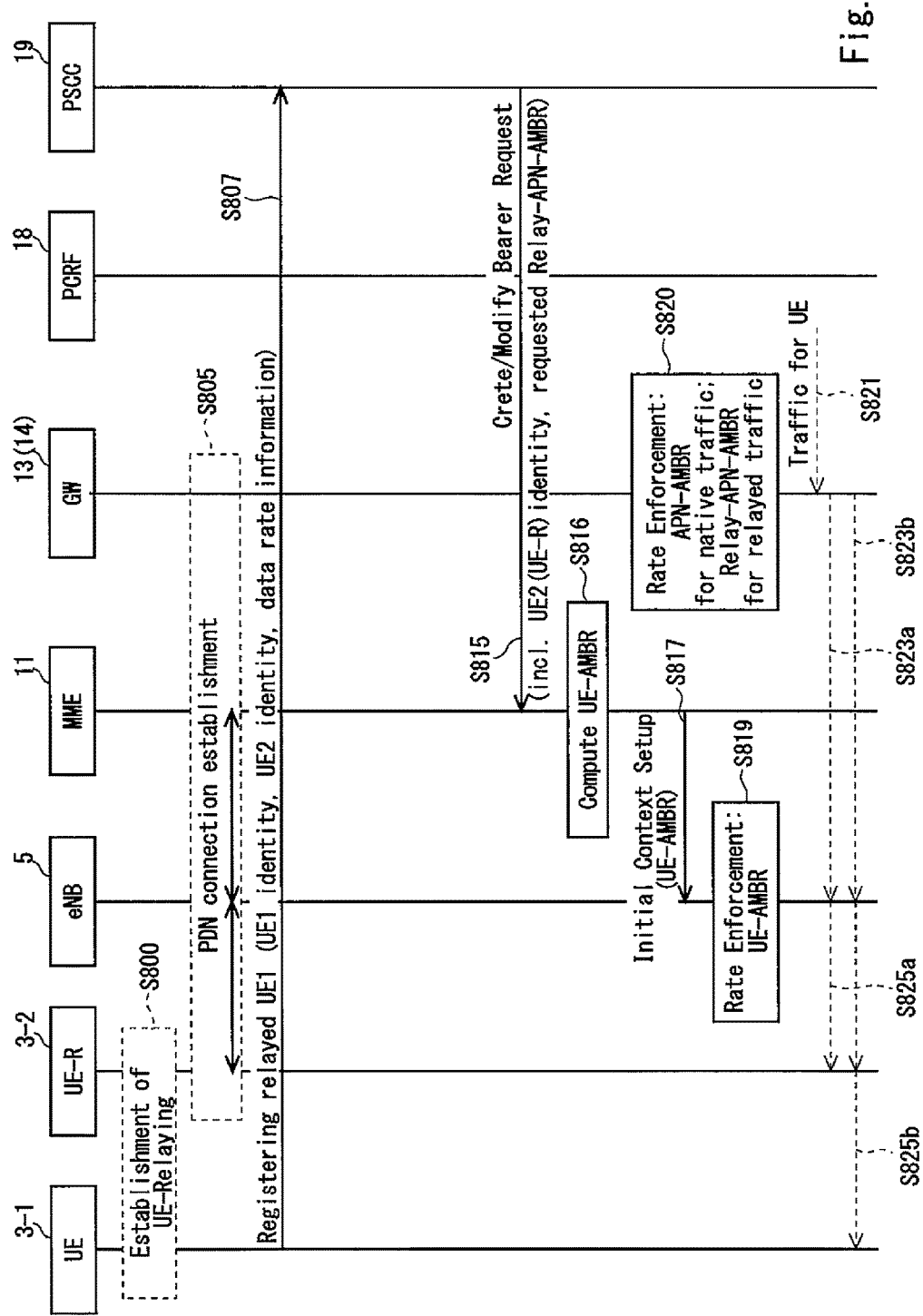
FIG. 8 is a timing diagram illustrating another exemplary way in which rate enforcement may be realised in the system shown in FIG. 1.

FIG. 8 is a timing diagram illustrating an exemplary way in which rate enforcement may be realised in the system 1 shown in FIG. 1. In this case, however, the verification by the PCRF 19 is omitted.

Steps S800 to S807 generally correspond to steps S700 to S707 described above. However, in this embodiment, the AS 19 does not request the PCRF 18 verify the data rate required by the user communication device 3-1 against the network operator's policies (or the AS 19 has been pre-authorised by the PCRF 18 to skip such verification).

Thus, in this embodiment, the AS 19 generates and sends an appropriately formatted signalling message (e.g. a "Create/Modify Bearer Request" message and/or the like) to the MME 11 (possibly relayed by the P-GW 14). The AS 19 includes in this message the information identifying the UE-R 3-2 (e.g. the MSISDN thereof or other such identification information) and the requested bit rate value to be enforced by the P-GW 14 for the first user communication device 3-1.

Upon receipt of the signalling message from the P-GW 14, the MME 11 proceeds to calculating the value for the UE-AMBR for the UE-R 3-2 so that the value takes into account the bit rate required by the user communication device 3-1. The MME 11 also provides the applicable Relay-APN-AMBR parameter (received at S815) to the P-GW 14.

Steps S816 to S825*b* generally correspond to steps S716 to S725*b* described with reference to FIG. 7, thus their description is not repeated here. It will be appreciated that the AS 19 may send the bit rate information directly to the MME 11 and the MME 11 may use this information to configure the P-GW 14-2.

<Packet Handling by the APN>

Figure 9:
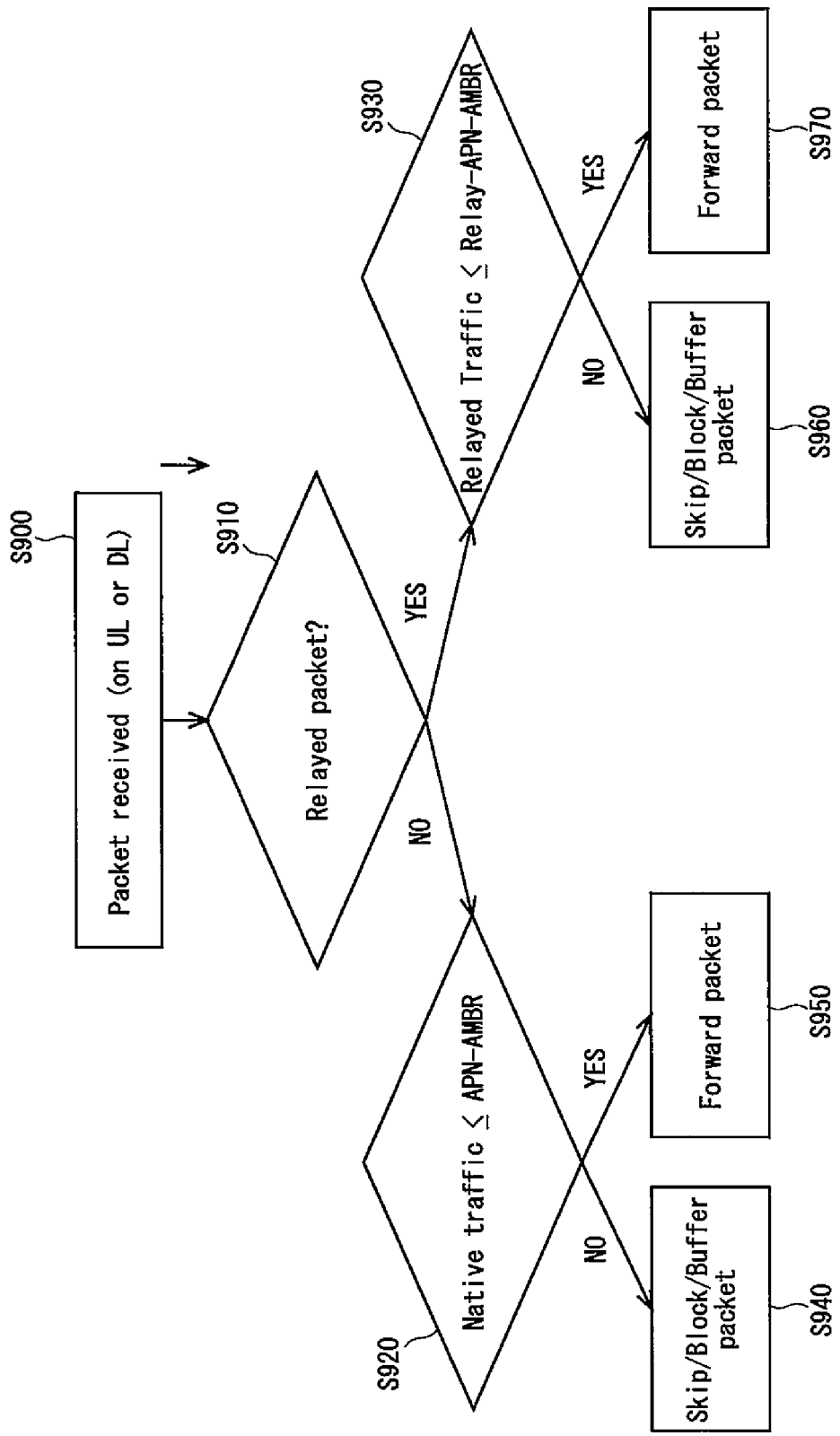
FIG. 9 is a flow chart illustrating an exemplary way in which packet handling may be realised in a gateway in accordance with FIG. 7 or 8.

FIG. 9 is a flow chart illustrating an exemplary way in which packet handling may be realised in a PDN gateway 14 in accordance with FIG. 7 or 8.

In this embodiment, the P-GW 14 is able to distinguish between the UE-R's 3-2 relayed traffic and native traffic. For example, the P-GW 14 may rely on appropriate TFT mechanisms, IP address and/or IP level parameter based filtering, port number filtering, and/or any other appropriate traffic information filtering to distinguish between relayed traffic and native traffic.

The procedure starts at step S900, in which the P-GW 14 receives a packet to/from the UE-R 3-2. In order to determine whether or not the packet can be forwarded, the P-GW 14 proceeds to step S910, in which the P-GW 14 (i.e. its rate enforcement module 105) checks whether the received packet relates to native traffic or relayed traffic. If the result of this check indicates that the received packet does not relate to relayed traffic (step S910: "NO"), i.e. it relates to the UE-R's 3-2 native traffic, then the P-GW 14 proceeds to step S920. However, if the result of this check indicates that the received packet relates to relayed traffic (step S910: "YES"), then the P-GW 14 proceeds to step S930.

In step S920, the P-GW 14 (i.e. its rate enforcement module 105) checks whether the normal (i.e. non-relayed) traffic for the UE-R 3-2 is below its associated aggregate maximum bit rate via that P-GW 14 (APN-AMBR). If the result of this check indicates that the normal traffic for the UE-R 3-2 has reached or exceeded (i.e. it is not below) its associated aggregate maximum bit rate via that P-GW 14 (step S920: "NO"), then the rate enforcement module 105 blocks transmission of the received packet, at step S940, and returns to step S900 for processing the next packet (i.e. the P-GW 14 skips the current packet and proceeds to the next packet).

However, if the result of the check at S920 indicates that the normal traffic for the UE-R 3-2 is below its associated aggregate maximum bit rate via that P-GW 14 (step S920: "YES"), then the rate enforcement module 105 instructs, at step S950, the communication control module 103 to forward the processed packet towards its destination. The P-GW 14 then returns to step S900 for processing the next packet.

Returning now to step S930, the P-GW 14 (i.e. its rate enforcement module 105) checks whether the relayed traffic for the UE-R 3-2 is below its associated aggregate maximum bit rate via that P-GW 14 (Relay-APN-AMBR). If the result of this check indicates that the relayed traffic for the UE-R 3-2 has reached or exceeded (i.e. it is not below) its associated aggregate maximum bit rate via that P-GW 14 (step S930: "NO"), then the rate enforcement module 105 blocks transmission of the received packet, at step S960, and returns to step S900 for processing the next packet (i.e. the P-GW 14 skips the current packet and proceeds to the next packet).

However, if the result of the check at S930 indicates that the relayed traffic for the UE-R 3-2 is below its associated aggregate maximum bit rate via that P-GW 14 (step S930: "YES"), then the rate enforcement module 105 instructs, at step S970, the communication control module 103 to forward the processed packet towards its destination. The P-GW 14 then returns to step S900 for processing the next packet.

Figure 10:
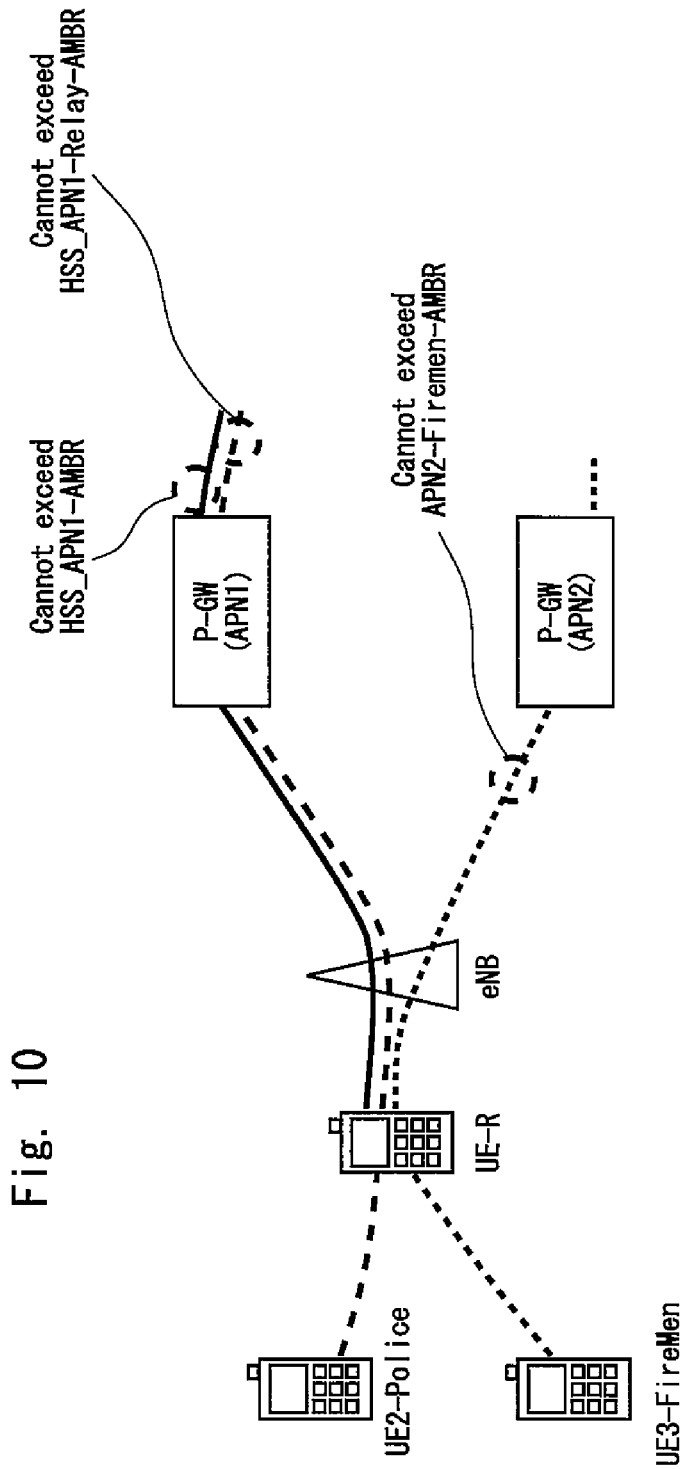
FIG. 10 illustrates an exemplary rate enforcement scenario in accordance with FIG. 7 or 8.

FIG. 10 illustrates an exemplary rate enforcement scenario in accordance with FIG. 9.

In summary, the above embodiments provide at least the following benefits:

Flexibility: the allowed bit rate values may be fixed by the network operator at any level (e.g. network, cell, group of users, individual user level) according to the operator's policy and/or changed dynamically in dependence on situations (e.g. to account for an increase in relayed data and/or overall network load). This allows the network operator to find an optimal trade-off between allowing communications for the UE-R, for any relayed user communication devices, and for "regular" non-relayed user communication devices in the network.

Compatibility with current (Release 12) 3GPP standards (including ProSe). Compatibility can be maintained because (at least some of) the embodiments have no impact on the device-to-device communication bearer and on the radio access network.

Simplicity/limited cost: the above embodiments do not require any new/modified interface with external equipment such as a ProSe Function, a Public Safety Application Server, and/or the like. The embodiments also do not require any additional signalling on top of already existing signalling messages exchanged between the network nodes (i.e. even when new parameters are used, these new parameters may be sent using the existing signalling messages). In addition, the embodiments do not require any change in existing management of AMBR parameters for roaming subscribers.

<Modifications and Alternatives>

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above description the "dynamic" or "requested" APN-AMBR is referred to generically as a Requested-Relay-APN-AMBR. It will be appreciated that the "dynamic" or "requested" APN-AMBR may be associated with a particular public or other service (e.g. police, fire, ambulance, search and rescue or the like) and may be in the form of an APN-Service-AMBR (for example, "APN-Fireman-AMBR", "APN-SearchRescue-AMBR" etc).

It will be appreciated that whilst, in the above embodiments, the relayed UE provides data rate information comprising a requested APN-AMBR (or other data rate information based upon which a requested APN-AMBR can be determined) to the AS (via intermediate communication nodes as appropriate), and that this data rate information (or an APN-AMBR determined based on it) may be sent from the AS to the MME (via intermediate communication nodes as appropriate), this need not be the case. For example, the relayed UE may provide information from which an appropriate APN-AMBR may be determined, to the UE-R, in a relay request (prior to the relaying connection being set up). This information may, for example, be in the form of a service, user, or APN identifier (e.g. a Fireman_ID or dedicated fire service APN ID). The UE-R may then obtain the appropriate APN-AMBR from the AS, for example using an appropriate "fetch" command or the like including the information from which the appropriate APN-AMBR may be determined. An authentication/verification/security procedure may be carried out with the AS, at an application level, without (directly) involving for example, PCRF. Once obtained the appropriate APN-AMBR may be provided to the MME (e.g. via the base station) during Relay PDN connection establishment for the MME to use in the calculation of a UE-AMBR as described previously.

Similarly, the UE may provide the appropriate APN-AMBR directly to the UE-R, in a relay request (prior to the relaying connection being established). The UE-R then does not need to obtain the appropriate APN-AMBR from the AS and can simply provide the received APN-AMBR to the MME (e.g. via the base station) during Relay PDN connection establishment for the MME to use in the calculation of a UE-AMBR as described previously.

The UE-R may recover the bit rate information from data received from the UE and send the retrieved information to another node such as the MME or AS (e.g. PSCC).

In the above possible modifications, the Requested-Relay-APN-AMBR value could be provided by the MME to P-GW during PDN connection establishment for the P-GW to apply traffic control enforcement as described previously (e.g. as opposed to the P-GW receiving the information from the AS (directly or via the PCRF).

It will be understood that, instead of using AA & IP-CAN messages with new parameters, new messages may be defined. For example, a single/common Create/Modify Bearer Request could be defined which goes directly from the Application Server to the PCRF, from the PCRF to the S/P-GW and then on to MME. Whilst this new message may be a common Create/Modify Bearer Request message for all nodes/devices, one or more different messages may be used and that a Create/Modify Bearer Request message need not be used at all.

The P-GW may be able to distinguish between Relay traffic and Normal ("native") traffic (e.g. through TFT mechanisms, an IP address and/or an IP level parameter based filtering; and/or any other appropriate traffic information such as port number) the P-GW may apply a rate enforcement strategy based on the new Requested-Relay-APN-AMBR value.

Similarly, the P-GW may apply a strategy based on legacy APN-AMBR only. In this case, the new ("updated") UE-AMBR value may be the AMBR value computed based on the Requested-Relay-APN-AMBR (at the MME) for use in traffic control. The new ("updated") UE-AMBR value will be sent to eNB by the MME in order to enforce the eNB rates for native UE-R traffic and relayed UE-R traffic.

If the relayed and/or native traffic are above the parameters calculated and configured by the MME (e.g. Requested-Relay-APN-AMBR and/or APN-AMBR), the P-GW may drop or buffer (for later use) the correspondent data packets. This assures that the traffic (relayed and/or native) is limited to a certain value.

Whilst the embodiments involving provision of a requested or dynamic AMBR by a UE and/or UE-R are particularly advantageous in terms of flexibility to cater for differing data throughput requirements, it will be appreciated that some benefit may also be realised by increasing the capacity of the enhanced radio access bearers (E-RABs) used to communicate information from the relayed UEs rather than using E-RABs limited to a maximum authorized capacity. This increase could be applied dynamically, dependent on prevailing data throughput requirements, or could be set semi-statically based on the general requirements of a particular service or user.

It will be appreciated that the identities of the UE/UE-R provided in messages between the various communication entities may be, when the AS is outside the core network, "external" identities, such as: an International mobile Subscriber Identity (IMSI); a Mobile Station International Subscriber Directory Number (MSISDN); an Internet Protocol (IP) address; a Public Safety ID; a Proximity Services Identifier (ProSe ID); URL address; SIP address; an application level identity or any other type of similar information. The identities of the UE/UE-R provided in messages between the various communication entities may be, when the AS is inside the core network, an "internal" identity such as: a Globally Unique Temporary Identifier (GUTI); a Temporary Mobile Subscriber Identity (TMSI); and an IP address, or any other similar identity.

In the above examples, relayed communication paths have been described to use an LTE technology (i.e. the same communication technology that is used between the base station and the relaying user communication device). However, it will be appreciated that a communication path may be relayed using any communication technology, for example, WLAN (Wireless Local Area Network), Wi-Fi (Wireless Fidelity), FlashLinQ, WiMAX (Worldwide Interoperability for Microwave Access), Bluetooth, BLE (Bluetooth Low Energy), ZigBee, etc. (irrespective of the communication technology used between the base station and the relaying user communication device).

It will be appreciated that the base station may comprise a Low Power Node (LPN), such as a home base station, a femto base station, and/or the like. It will also be appreciated that either one of (or both) the relaying and the relayed user communication devices may comprise an LPN.

In the above examples, two user communication devices were allowed to establish a direct D2D connection with each other. As those skilled in the art will appreciate, such connections may be established between three or more user communication devices, such that the users of the communication devices may be connected together in a conference call setup. In this case, a D2D bearer may be provided between three or more user communication devices (e.g. all user communication devices relayed via the same UE-R).

In the above description, a D2D bearer is provided between the relaying user communication device and the relayed user communication device(s) for relaying data. It will be appreciated that such a "D2D bearer" may comprise at least one of: a D2D radio bearer; a D2D EPS bearer; a D2D service bearer; and/or the like.

In the above embodiments, the user equipment comprises mobile (cellular) communication devices. Other types of user communication devices such as, for example, mobile telephones, smartphones, personal digital assistants, laptop computers, web browsers, MTC (Machine Type Communication) devices, etc. could be used.

In the above description of FIGS. 7 and 8, specific signalling messages were given as examples (e.g. "Initial Context Setup" messages). However, it will be appreciated that different signalling messages may also be used, for example any suitable Access Stratum (AS) and/or Non-Access Stratum (NAS) messages and/or non-3GPP messages.

It will be appreciated that some messages may be sent from/to the network at the same time (e.g. combined) and/or messages may be sent at different times, and in a different order than they are presented above.

In the above description of steps S940 and S960 of FIG. 9, the P-GW is described to block transmission of the packet being processed. However, it will be appreciated that the P-GW may block the packet only temporarily. In this case, the packet may be buffered for a predetermined amount of time, e.g. until it is determined that the (relayed) traffic fulfils the condition (of the respective preceding step) for forwarding that packet towards it destination.

It will also be appreciated that a D2D (or ProSe) capable UE may have multiple connections with other UEs, UE-Rs, and/or other D2D UEs, if appropriate.

The above examples have been discussed with reference to UE-R technology. However, it will be appreciated that the examples are also applicable to other fields such as D2D (Device-to-Device), P2P (Peer-to-Peer), and/or P2M (Peer-to-Multipeer) technologies.

In the above description, the UE-R is described as a standalone entity. However, it will be appreciated that the UE-R functionality described above may be implemented using multiple entities. For example, the UE-R functionality may be provided by a plurality of user communication devices connected in a hop-by-hop manner to a base station, using respective D2D/ProSe connections to provide each "hop" between two neighbour user communication devices. It will also be appreciated that the UE-R may be provided in the form of an apparatus, e.g. as a user communication device connected to a wireless router, laptop computer, and/or the like.

In the above description, the user communication devices, the base station, the mobility management entity, and the PDN gateway are described for ease of understanding as having a number of discrete functional components or modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In the above embodiments, a number of software modules were described. As those skilled in the art will appreciate, the software modules may be provided in compiled or un-compiled form and may be supplied to the user communication devices, the base station, the mobility management entity, and the PDN gateway as a signal over a computer network, or on a recording medium. Further, the functionality performed by part or all of this software may be performed using one or more dedicated hardware circuits. However, the use of software modules is preferred as it facilitates the updating of the user communication devices, the base station, the mobility management entity, and the PDN gateway in order to update their functionalities.

The software module (i.e., computer program) can be stored and provided to a computer device using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to the computer device using any type of transitory computer readable media. Examples of transitory computer readable media include electric signals, optical signals, and electromagnetic waves. Transitory computer readable media can provide the program to the computer device via a wired communication line, such as electric wires and optical fibers, or a wireless communication line.

Various other modifications will be apparent to those skilled in the art and will not be described in further detail here.

Glossary of 3GPP Terms

AMBR—Aggregate Maximum Bit Rate
APN—Access Point Name
AS—Access Stratum
D2D—Device to Device
DL—Downlink
eNB—Evolved Node B, E-UTRAN base station
EPC—Evolved Packet Core
EPS—Evolved Packet System
E-UTRA—Evolved UMTS Terrestrial Radio Access
E-UTRAN—Evolved UMTS Terrestrial Radio Access Network
GBR—Guaranteed Bit Rate
GCSE—Group Communication System Enablers
GPRS—General Packet Radio Service
GTP—GPRS Tunnelling Protocol
HSS—Home Subscriber Server
LTE—Long Term Evolution (of UTRAN)
MME—Mobility Management Entity
NAS—Non-Access-Stratum
P-GW—PDN Gateway
ProSe—Proximity-based Services
(E-)RAB—(EPS-) Radio Access Bearer
RRC—Radio Resource Control
S-GW—Serving Gateway
TFT—Traffic Flow Template
UE—User Equipment UE-R—UE Relay
UL—Uplink
UMTS—Universal Mobile Telecommunications System This application is based upon and claims the benefit of priority from United Kingdom patent application No. 1404962.1, filed on Mar. 19, 2014, the disclosure of which is incorporated herein in its entirety by reference.

REFERENCE SIGNS LIST

1 COMMUNICATION NETWORK
3 UE, USER COMMUNICATION DEVICE
5 BASE STATION
7 CORE NETWORK
10 EXTERNAL NETWORK
11 MME
13 S-GW
14 P-GW
18 PCRF
19 AS
31, 51, 71, 91, 111 TRANSCEIVER CIRCUIT
33, 53 ANTENNA
35 USER INTERFACE
37, 57, 77, 97, 117 CONTROLLER
39, 59, 79, 99, 119 MEMORY
41, 61, 81, 101, 121 OPERATING SYSTEM
43, 63, 83, 103, 123 COMMUNICATION CONTROL MODULE
45 EPS MODULE
47 REGISTRATION MODULE
48 D2D MODULE
49 RELAY MODULE
55, 75, 115 NETWORK INTERFACE
65, 105 RATE ENFORCEMENT MODULE
85 AMBR CONFIGURATION MODULE
125 VERIFICATION MODULE

The invention claimed is:

1. A relaying user communication device for relaying communication data for other user communication devices in a cellular communication network, the relaying user communication device comprising:
a transceiver circuit configured to communicate with other communication devices in the cellular communication network, wherein the transceiver circuit is configured to:
communicate via a first communication interface with at least one other user communication device; and
communicate via a second communication interface with a base station; and
a processor configured to:
relay communication data received from each other user communication device via said first interface, to said base station via said second interface;
relay communication data received from the base station via said second interface for each other user communication device, to that other user communication device, via said first interface; obtain information identifying a bit rate for relaying communication data for at least one other user communication device, by receiving the information identifying a bit rate from the at least one other user communication device to which the bit rate relates; and control said transceiver circuit to send, to at least one core network node via said base station, said information identifying a bit rate for relaying communication data for the at least one other user communication device to which the bit rate relates,
wherein said information identifying a bit rate comprises an aggregate maximum bit rate (AMBR).

2. The relaying user communication device according to claim 1, wherein the processor is further configured to:
obtain said information identifying a bit rate for relaying communication data for at least one other user communication device during a process to register said at least one other user communication device with an application server (AS).

3. The relaying user communication device according to claim 1, wherein the processor is further configured to:
obtain said information identifying a bit rate for relaying communication data for at least one other user communication device during a process to establish a relaying connection.

4. The relaying user communication device according to claim 1, wherein the processor is further configured to:
obtain said information identifying a bit rate for relaying communication data for at least one other user communication device:
by receiving an identifier associated with said bit rate from the at least one other user communication device to which the bit rate relates; and
by obtaining said information identifying a bit rate for relaying communication data for the at least one other user communication device to which the bit rate relates based on said received identifier.

5. The relaying user communication device according to claim 4, wherein the processor is further configured to:
obtain said information identifying a bit rate for relaying communication data for at least one other user communication device during a process to establish a relaying connection.

6. The relaying user communication device according to claim 1, wherein the processor is further configured to:
control the transceiver circuit to send, to a core network device via said base station, said information identifying a bit rate in association with information identifying said relaying user communication device.

7. The relaying user communication device according to claim 1, wherein the processor is further configured to:
control the transceiver circuit to send, to a core network device via said base station, said information identifying a bit rate in association with information identifying said at least one other user communication device to which the bit rate relates.

8. The relaying user communication device according to claim 6, wherein said information identifying said relaying user communication device and/or said information identifying at least one other user communication device to which the bit rate relates comprises at least one of:
an International mobile Subscriber Identity (IMSI) associated with that user device;
an IP address associated with that user device; a public safety identifier associated with that user device;
a Mobile Station International Subscriber Directory Number (MSISDN) associated with that user device;
a proximity services identifier (ProSe ID) associated with that user device;
a Temporary Mobile Subscriber Identifier (TMSI) associated with that user device; and
a Globally Unique Temporary Identifier (GUTI) associated with that user device.

9. The relaying user communication device according to claim 1, wherein said information identifying a bit rate comprises an aggregate maximum bit rate (AMBR) for a specific access point (APN_AMBR).

10. The relaying user communication device according to claim 1,
wherein said information identifying a bit rate comprises an aggregate maximum bit rate (AMBR) associated with a particular service.

11. The relaying user communication device according to claim 10,
wherein said information identifying a bit rate comprises an aggregate maximum bit rate (AMBR) associated with a particular public safety service.

12. The relaying user communication device according to claim 10, wherein said information identifying a bit rate comprises an aggregate maximum bit rate (AMBR) associated with a particular user or user communication device identifier (user ID or user communication device ID).

13. The relaying user communication device according to claim 1, wherein said at least one core network node comprises at least one of:
a gateway device;
a mobility management entity (MME); and
a Policy and Charging Rules Function (PCRF).

14. The relaying user communication device according to claim 1, wherein the processor is further configured to:
control the transceiver circuit to send, to at least one of a core network node and an application server, said information identifying a bit rate.

15. A user communication device for communicating data to a relaying user communication device for relaying by the relaying user communication device in a cellular communication network, the user communication device comprising:
a transceiver circuit configured to communicate with other communication devices in the cellular communication network, the transceiver circuit being configured to communicate, via a communication interface with the relaying user communication device, information identifying a bit rate for relaying communication data on behalf of said user communication device,
wherein said information identifying a bit rate comprises an aggregate maximum bit rate (AMBR).

16. The user communication device according to claim 15,
wherein said information identifying a bit rate for relaying communication data on behalf of said user communication device comprises an identifier associated with said bit rate.

17. A core network node comprising:
a transceiver circuit configured to:
receive information, provided via a relaying user communication device, identifying a bit rate for relaying communication data for at least one other user communication device;
send, to said relaying user communication device, said parameter for controlling data throughput; and
receive said information identifying a bit rate, from the relaying user communication device, via another core network node; and
a processor configured to:
generate, based on said information, provided via the relaying user communication device, identifying a bit rate:
a parameter for controlling data throughput for communications with said relaying user communication device when said relaying user communication device has a relaying connection with said at least one other user communication device, wherein
said information identifying the bit rate is received, by the relaying user communication device, from the at least one other user communication device to which the bit rate relates, and
said information identifying a bit rate comprises an aggregate maximum bit rate (AMBR).

18. The core network node according to claim 17, wherein said transceiver circuit is further configured to:
receive said information identifying a bit rate, from the relaying user communication device, via a base station without involving a core network gateway.

19. The core network node according to claim 17, wherein said transceiver circuit is further configured to:
receive said information identifying a bit rate, from the relaying user communication device, via a core network gateway.

20. The core network node according to claim 17, wherein said transceiver circuit is further configured to:
receive said information identifying a bit rate in association with information identifying said relaying user communication device via which the information identifying a bit rate was provided.

21. The core network node according to claim 17, wherein said core network node comprises a mobility management entity (MME).

22. A core network node comprising:
a transceiver circuit configured to receive information, provided via a relaying user communication device, identifying a bit rate for relaying communication data for at least one other user communication device in association with information identifying the relaying user communication device via which the information identifying a bit rate was provided; and
a processor configured to control data throughput for communications with said relaying user communication device, when said relaying user communication device has a relaying connection with said at least one other user communication device, based on said bit rate requested via said relaying user communication device, wherein
said information identifying the bit rate is received, by the relaying user communication device, from the at least one other user communication device to which the bit rate relates, and
said information identifying a bit rate comprises an aggregate maximum bit rate (AMBR).

23. The core network node according to claim 22,
wherein said core network node comprises a gateway device.

24. A communication node, comprising:
a transceiver circuit configured to:
receive, via a relaying user communication device, information identifying a bit rate for relaying communication data for at least one other user communication device in association with information identifying the relaying user communication device via which the information identifying a bit rate was provided; and
send, to another core network node, said information identifying a bit rate for relaying communication data for at least one other user communication device in association with said information identifying the relaying user communication device via which the information identifying a bit rate was provided, wherein said information identifying the bit rate is received, by the relaying user communication device, from the at least one other user communication device to which the bit rate relates, and said information identifying a bit rate comprises an aggregate maximum bit rate (AMBR).

25. The communication node according to claim 24, wherein said communication node further comprises a gateway device.

26. The communication node according to claim 24, further comprising:
an application server.

27. The communication node according to claim 24, further comprising:
a processor configured to:
verify whether a bit rate represented by said information identifying a bit rate is in conformity with at least one operator policy,
wherein said transceiver circuit is further configured to:
send, to said another core network node, said information identifying a bit rate when said information identifying a bit rate is in conformity with at least one operator policy, and
not send, to said another core network node, said information identifying a bit rate when said information identifying a bit rate is not in conformity with at least one operator policy.

28. The communication node according to claim 27,
wherein said processor is further configured to adjust a value of said bit rate when said information identifying a bit rate is not in conformity with at least one operator policy, and
wherein said transceiver circuit is further configured to send, to said another core network node, information identifying said adjusted bit rate, when said information identifying a bit rate is not in conformity with at least one operator policy.

29. The communication node according to claim 27, wherein said core network node comprises a Policy and Charging Rules Function (PCRF).

30. A system comprising:
a relaying user communication for relaying communication data for other user communication devices in a cellular communication network, the relaying user communication device comprising:
a first transceiver circuit configured to communicate with other communication devices in the cellular communication network, wherein the first transceiver circuit is configured to:
communicate via a first communication interface with at least one other user communication device; and
communicate via a second communication interface with a base station; and
a first processor configured to:
relay communication data received from each other user communication device via said first interface, to said base station via said second interface;
relay communication data received from the base station via said second interface for each other user communication device, to that other user communication device, via said first interface;
obtain information identifying a bit rate for relaying communication data for at least one other user communication device, by receiving the information identifying a bit rate from the at least one other user communication device to which the bit rate relates; and control said transceiver circuit to send, to at least one core network node via said base station, said information identifying a bit rate for relaying communication data for the at least one other user communication device to which the bit rate relates;
a user communication device for communicating data to a relaying user communication device for relaying by the relaying user communication device in a cellular communication network, the user communication device comprising:
a second transceiver circuit configured to communicate with other communication devices in the cellular communication network, the second transceiver circuit being configured to communicate, via a communication interface with the relaying user communication device, information identifying a bit rate for relaying communication data on behalf of said user communication device;
a core network node comprising:
a third transceiver circuit configured to:
receive information, provided via a relaying user communication device, identifying a bit rate for relaying communication data for at least one other user communication device;
send, to said relaying user communication device, said parameter for controlling data throughput; and
receive said information identifying a bit rate, from the relaying user communication device, via another core network node; and
a second processor configured to:
generate, based on said information, provided via the relaying user communication device, identifying a bit rate:
a parameter for controlling data throughput for communications with said relaying user communication device when said relaying user communication device has a relaying connection with said at least one other user communication device;
a core network node comprising:
a fourth transceiver circuit configured to receive information, provided via a relaying user communication device, identifying a bit rate for relaying communication data for at least one other user communication device in association with information identifying the relaying user communication device via which the information identifying a bit rate was provided; and
a third processor configured to control data throughput for communications with said relaying user communication device, when said relaying user communication device has a relaying connection with said at least one other user communication device, based on said bit rate requested via said relaying user communication device; and
a communication node comprising:
a fifth transceiver circuit configured to:
receive, via a relaying user communication device, information identifying a bit rate for relaying communication data for at least one other user communication device in association with information identifying the relaying user communication device via which the information identifying a bit rate was provided; and send, to another core network node, said information identifying a bit rate for relaying communication data for at least one other user communication device in association with said information identifying the relaying user communication device via which the information identifying a bit rate was provided, wherein said information identifying the bit rate is received, by the relaying user communication device, from the at least one other user communication device to which the bit rate relates, and said information identifying a bit rate comprises an aggregate maximum bit rate (AMBR).

31. A method performed by a relaying user communication device for relaying communication data for other user communication devices in a cellular communication network, the relaying user communication device comprising a transceiver circuit configured to communicate via a first communication interface with at least one other user communication device and to communicate via a second communication interface with a base station, the method comprising:

obtaining information identifying a bit rate for relaying communication data for at least one other user communication device;

controlling transceiver circuit to send, to at least one core network node via said base station, said information identifying a bit rate for relaying communication data for the at least one other user communication device to which the bit rate relates; and controlling transceiver circuit to relay communication data received from each other user communication device via said first interface, to said base station via said second interface, and to relay communication data received from the base station via said second interface for each other user communication device, to that other user communication device, via said first interface, wherein said information identifying the bit rate is received, by the relaying user communication device, from the at least one other user communication device to which the bit rate relates, and said information identifying a bit rate comprises an aggregate maximum bit rate (AMBR).

32. A method performed by a user communication device for communicating data to a relaying user communication device for relaying by the relaying user communication device in a cellular communication network, the method comprising:

communicating, via a communication interface with the relaying user communication device, information identifying a bit rate for relaying communication data on behalf of said user communication device, wherein said information identifying a bit rate comprises an aggregate maximum bit rate (AMBR).

33. A method performed by a core network node, the method comprising:

receiving information, provided via a relaying user communication device, identifying a bit rate for relaying communication data for at least one other user communication device;

generating, based on said information, provided via a relaying user communication device, identifying a bit rate;

a parameter for controlling data throughput for communications with said relaying user communication device when said relaying user communication device has a relaying connection with said at least one other user communication device; and sending, to said relaying user communication device, said parameter for controlling data throughput, wherein receiving the information includes receiving said information identifying a bit rate, from the relaying user communication device, via another core network node, wherein said information identifying the bit rate is received, by the relaying user communication device, from the at least one other user communication device to which the bit rate relates, and said information identifying a bit rate comprises an aggregate maximum bit rate (AMBR).

34. A method performed by a core network node, the method comprising:

receiving information, provided via a relaying user communication device, identifying a bit rate for relaying communication data for at least one other user communication device in association with information identifying the relaying user communication device via which the information identifying a bit rate was provided; and controlling data throughput for communications with said relaying user communication device, when said relaying user communication device has a relaying connection with said at least one other user communication device, based on said bit rate requested via said relaying user communication device, wherein said information identifying the bit rate is received, by the relaying user communication device, from the at least one other user communication device to which the bit rate relates, and said information identifying a bit rate comprises an aggregate maximum bit rate (AMBR).

35. A method performed by a communication node, the method comprising:

receiving, via a relaying user communication device, information identifying a bit rate for relaying communication data for at least one other user communication device in association with information identifying the relaying user communication device via which the information identifying a bit rate was provided; and sending, to another core network node, said information identifying a bit rate for relaying communication data for at least one other user communication device in association with said information identifying the relaying user communication device via which the information identifying a bit rate was provided, wherein said information identifying the bit rate is received, by the relaying user communication device, from the at least one other user communication device to which the bit rate relates, and said information identifying a bit rate comprises an aggregate maximum bit rate (AMBR).

36. A non-transitory computer readable media that stores a computer program including instructions for causing a computer-programmable device to perform a method according to claim 31.

* * * * *